United States Patent
Kubo et al.

(10) Patent No.: US 6,335,923 B2
(45) Date of Patent: *Jan. 1, 2002

(54) MOBILE COMMUNICATION TERMINAL AND TRANSMISSION POWER CONTROL METHOD THEREFOR

(75) Inventors: Tokurou Kubo; Morihiko Minowa; Satoshi Nakamura; Kensuke Sawada; Kazuhisa Obuchi, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/810,707

(22) Filed: Mar. 3, 1997

(30) Foreign Application Priority Data

Sep. 3, 1996 (JP) .............................. 8-233203

(51) Int. Cl.[7] .............................. H04B 7/216
(52) U.S. Cl. ................ 370/335; 370/342; 370/332; 370/318; 455/522; 375/144
(58) Field of Search ................ 455/69, 522, 441, 455/314, 38.3; 370/318, 252, 332, 342, 320, 335, 441, 479, 311; 375/200, 144

(56) References Cited

U.S. PATENT DOCUMENTS

| 4,811,421 A | * | 3/1989 | Havel | 455/69 |
| 5,574,747 A | | 11/1996 | Lomp | |
| 5,574,984 A | * | 11/1996 | Reed | 455/69 |
| 5,585,805 A | * | 12/1996 | Takenaka et al. | 342/461 |

FOREIGN PATENT DOCUMENTS

| JP | 3-035625 | | 2/1991 |
| JP | 10084313 | * | 3/1998 |

* cited by examiner

Primary Examiner—Ajit Patel
(74) Attorney, Agent, or Firm—Staas & Halsey LLP

(57) ABSTRACT

A mobile communication terminal receives a control command transmitted on a down-link from a base station and controls a transmission power so that a reception state on an up-link becomes approximately constant at the base station. The mobile communication terminal is provided with a moving speed inferring unit which infers a moving speed of the mobile communication terminal, and a transmission power controller which varies a varying width of the transmission power depending on the moving speed of the mobile communication terminal.

18 Claims, 23 Drawing Sheets

SPEED=HIGH

SPEED=LOW

MOBILE COMMUNICATION TERMINAL AND TRANSMISSION POWER CONTROL METHOD THEREFOR

BACKGROUND OF THE INVENTION

The present invention generally relates to mobile communication terminals and transmission power control methods therefor, and more particularly to a mobile communication terminal which guarantees stable operation even when the mobile communication terminal moves at a high speed, and to a transmission power control method applicable to such a mobile communication terminal.

In mobile communication systems, there are demands to develop a system having a high frequency utilization efficiency. Among various systems proposed, a direct sequence code division multiple access (DS-CDMA) is regarded as the most prominent system that can improve the communication capacity.

When the DS-CDMA is applied to the mobile communication, received levels of up-link signals transmitted from a plurality of mobile communication terminals must be approximately the same at a base station. Otherwise, signal interference rates of the up-links from each of the mobile communication terminals will not become approximately the same, and it will be impossible to reproduce the up-links from the mobile communication terminals due to the poor signal interference rates.

For this reason, in the mobile communication employing the DC-CDMA, it is essential to control the reception power of each mobile communication terminal at a high speed with a high accuracy and a large dynamic range depending on changes in the distance from each mobile communication terminal to the base station, the shadowing of each mobile communication terminal caused by buildings or the like, and instantaneous fluctuations in the multipath of each mobile communication terminal.

The changes in the distance from the mobile communication terminal to the base station and the shadowing similarly occur on the up-links having different frequency bands. Hence, it is possible to cope with the changes in the distance from the mobile communication to the base station and the shadowing, by carrying out an open loop control which controls the transmission level of the up-link on which the mobile communication terminal transmits depending on the reception level of the down-link received by the mobile communication terminal. However, it is only possible to cope with the instantaneous fluctuations in the multipath by a closed loop control because the correlation between the up-link and the down-link is low when the frequency bands greatly differ. The closed loop control controls the transmission level of the up-link on which the mobile communication terminal transmits by sending a control command from the base station to the mobile communication terminal depending on the reception level of the up-link received by the base station.

According to the conventional DS-CDMA mobile communication system, a receiver of the base station detects the reception level from the mobile communication terminal which is to be controlled, and the instantaneous SIR and bit error rate (BER) are inferred. In addition, based on the above reception level, SIR and BER, a control command for controlling the transmission power of the mobile communication terminal is generated and transmitted to the mobile communication terminal with the down signal. The transmission rate of the control command for controlling the transmission power must be high enough to follow the instantaneous fluctuations in the reception level, SIR or BER generated on the up-link. For example, according to the standard IS-95, the control command rate is 800 bps, and an amount of control per command is 0.5 dB.

When the mobile communication terminal is located in a vehicle and the mobile communication terminal moves at a high speed, the fluctuating rate of the instantaneous fluctuations (Rayleigh fluctuations) of the multipath also becomes high, and the fluctuation width per unit time becomes large. In order to obtain a desired BER in such a case, the rate of the control command for controlling the transmission power of the mobile communication terminal must be made high compared to that of a slowly moving mobile communication terminal. However, when the control command rate is set high, the ratio of the control command with respect to the entire communication capacity of the down-link becomes large, and there is a problem in that the usable communication capacity becomes small.

SUMMARY OF THE INVENTION

Accordingly, it is a general object of the present invention to provide a novel and useful mobile communication terminal and transmission power control method therefor, in which the problems described above are eliminated.

Another and more specific object of the present invention is to provide a mobile communication terminal in which the transmission power is controlled so that a reception state on an up-link of a base station becomes approximately constant without being affected by instantaneous fluctuations even when the mobile communication terminal moves at a high speed, without having to increase the transmission rate of a control command that is transmitted from the base station to the mobile communication terminal, and to a transmission power control method for use in such a mobile communication terminal.

Still another object of the present invention is to provide a mobile communication terminal which receives a control command transmitted on a down-link from a base station and controls a transmission power so that a reception state on an up-link becomes approximately constant at the base station, which mobile communication terminal comprises a moving speed inferring unit inferring a moving speed of the mobile communication terminal, and a transmission power controller varying a varying width of the transmission power depending on the moving speed inferred in the moving speed inferring unit. According to the mobile communication terminal of the present invention, it is possible to make the varying width of the transmission power larger as the moving speed becomes faster and the instantaneous fluctuation becomes faster. For this reason, it is possible to make the reception state on the up-link of the base station approximately constant, without the need to increase the transmission rate of the control command of the base station. It is also possible to prevent the communication capacity of the down-link from decreasing. Furthermore, since the basic structure of the base station does not require modification, it is possible to prevent the cost of the system from increasing.

A further object of the present invention is to provide a transmission power control method adapted to a mobile communication terminal which receives a control command transmitted on a down-link from a base station and controls a transmission power so that a reception state on an up-link becomes approximately constant at the base station, where the mobile communication terminal includes a moving speed inferring unit inferring a moving speed of the mobile communication terminal, and a transmission power controller varying a varying width of the transmission power depending on the moving speed inferred in the moving speed inferring unit, and the transmission power control method comprises the steps of (a) employing a direct sequence code division multiple access (DS-CDMA) on the up-link and the down-link and transmitting a pilot signal on the up-link using an extrapolation technique, (b) varying, in the transmission power controller, a ratio of transmission powers of a pilot transmission signal and an information data transmission signal on the up-link depending on the moving speed inferred by the moving speed inferring unit, and (c) accumulating, in the base station, control commands to be transmitted to the mobile communication terminal and varying a passing bandwidth of a filter which is provided with respect to a reverse spread pilot signal on the up-link depending on an accumulated value. According to the transmission power control method of the present invention, it is possible to set the transmission power of the pilot transmission signal on the up-link to a minimum required value depending on the moving speed of the mobile communication terminal. In addition, it is possible to vary the passing bandwidth of the reverse spread pilot signal on the up-link depending on the power variation of the pilot signal on the up-link in accordance with the moving speed of the mobile communication terminal. Therefore, it is possible to reproduce the pilot signal in an optimum state.

Other objects and further features of the present invention will be apparent from the following detailed description when read in conjunction with the accompanying drawings.

DESCRIPTION OF THE PREFERRED EMBODIMENTS

Figure 1:
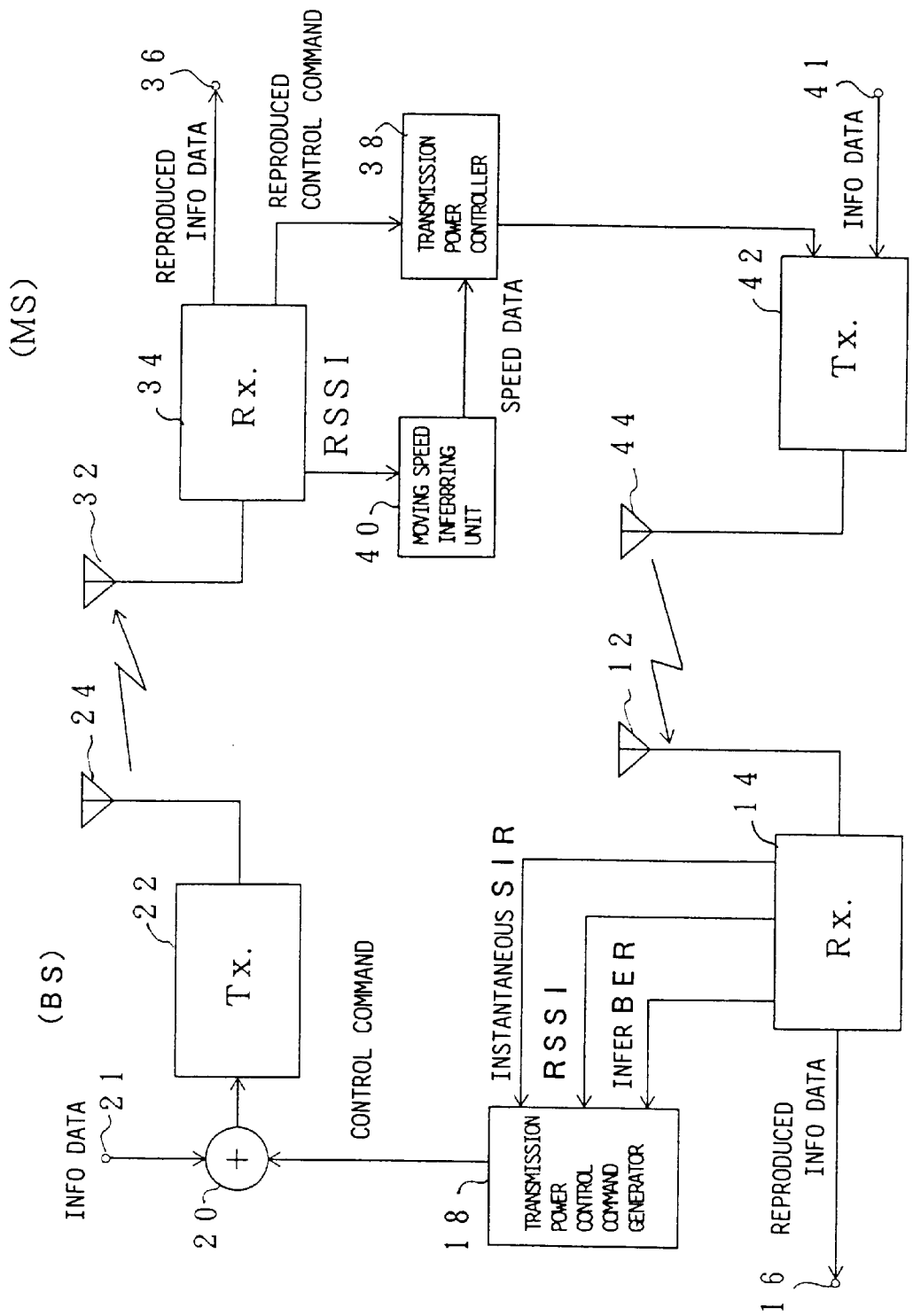
FIG. 1 is a system block diagram showing a first embodiment of a mobile communication terminal according to the present invention.

FIG. 1 shows a first embodiment of a mobile communication terminal according to the present invention. This embodiment of the mobile communication terminal employs a first embodiment of a transmission power control method according to the present invention.

In FIG. 1, a base station (BS) receives an up-link signal transmitted from a mobile communication terminal (MS) at an antenna 12, and a reverse spread in a receiver (Rx) 14. The receiver 14 further carries out a narrow band demodulation, and outputs a reproduced information data from a terminal 16. In addition, the receiver 14 detects the reception level, that is, a received signal strength indicator (RSSI), and infers an instantaneous signal interference rate (SIR) and a bit error rate (BER). The receiver 14 supplies the RSSI, instantaneous SIR and BET to a transmission power control command generator 18.

The transmission power control command generator 18 generates a control command for increasing or decreasing the transmission power of the mobile communication terminal depending on the received RSSI, instantaneous SIR and BER. For example, a control command for increasing the transmission power is generated when the SIR is less than or equal to a threshold value, and a control command for decreasing the transmission power is generated when the SIR exceeds the threshold value. The control command is passed through a mixer 20 and is supplied to a transmitter (Tx) 22 together with information data supplied via a terminal 21. The transmitter 22 carries out a narrow band modulation using the information data and the control command, and further carries out a spread modulation, thereby transmitting a down-link signal from an antenna 24. The control command is made up of 1 bit, and a bit value "1" indicates an increase while a bit value "0" indicates a decrease. A transmission rate of the control command is 800 bps, for example, and is constant.

At the mobile communication terminal, an antenna 32 receives the down-link signal, and a receiver 34 carries out a reverse spread and a narrow band demodulation. As a result, reproduced information data from the receiver 34 are output via a terminal 36. On the other hand, a reproduced control command from the receiver 34 is supplied to a transmission power controller 38. In addition, the RSSI detected by the receiver 34 is supplied to a moving speed inferring unit 40.

The moving speed inferring unit 40 infers the moving speed from the change in the RSSI, and supplies the inferred speed data to the transmission power controller 38. The transmission power controller 38 instructs the increasing or decreasing direction of the transmission power of a transmitter 42 based on the reproduced control command which is periodically supplied from the receiver 34, and instructs the varying width (step quantity) based on the speed data supplied from the moving speed inferring unit 40. The increasing direction is indicated when the value of the reproduced control command is "1", and the decreasing direction is indicated when the value of the reproduced control command is "0". For example, a varying width of 0.5 dB is indicated when the inferred moving speed is 0 km/h, a varying width of 1.0 dB is indicated when the inferred moving speed is 20 km/h, a varying width of 2.5 dB is indicated when the inferred moving speed is 40 km/h, and a varying width of 4.0 dB is indicated when the inferred moving speed is 60 km/h. If the transmission frequency is denoted by v, the inferred moving speed by v and the speed of light by C, a Doppler frequency $f_D$ can be described by $f_D = v \cdot v/C$, and if v=2 GHz, $f_D$=37 Hz when v=20 km/h. In other words, it is possible to describe the inferred moving speed by the Doppler frequency $f_D$. The transmitter 42 carries out a narrow band modulation using information data supplied from a terminal 41, and further carries out a spread modulation, thereby transmitting an up-link signal from an antenna 24. In this state, the transmission power is varied in steps depending on the instruction from the transmission power controller 38.

Accordingly, the moving speed is inferred from the RSSI in the mobile communication terminal, and the varying width of the transmission power is varied depending on the inferred moving speed. For this reason, even if the moving speed of the mobile communication terminal is high and the instantaneous fluctuations of the up-link at the base station occur at a high speed and the fluctuation width per unit time becomes large, it is possible to vary the transmission power of the mobile communication terminal with a varying width matching the fluctuation width. Moreover, since it is unnecessary to increase the control command rate, the communication capacity that may be used will not decrease.

Figure 2:
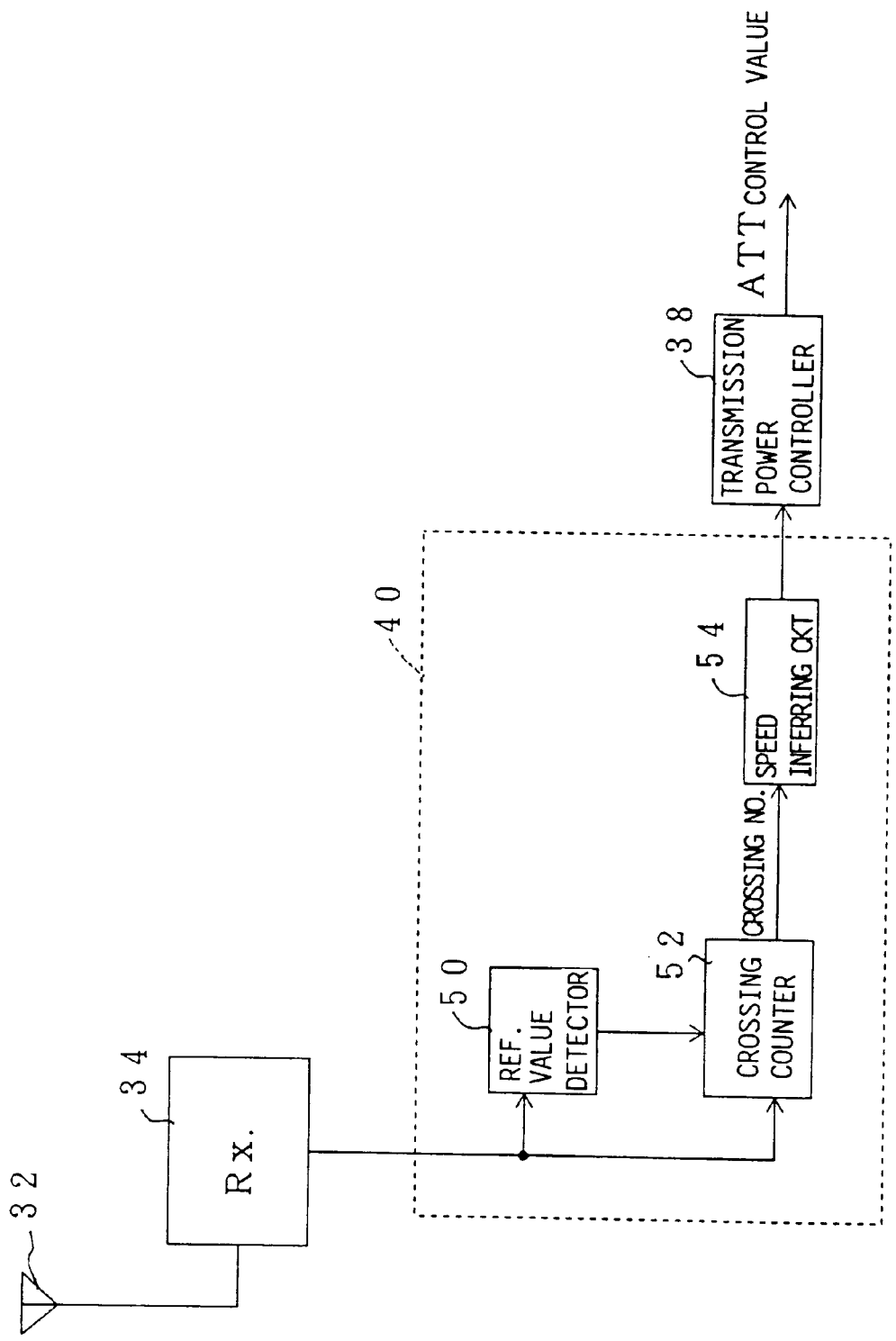
FIG. 2 is a system block diagram showing a first embodiment of a moving speed inferring unit.

FIG. 2 shows a first embodiment of the moving speed inferring unit 40. In FIG. 2, the RSSI output from the receiver 34 is supplied to a reference value detector 50 and a crossing counter 52 within the moving speed inferring unit 40. An reference value detector 50 obtains as a reference value a root-mean-square of an instantaneous value of the RSSI waveform indicated by a solid line in FIG. 3, and supplies this reference value to the crossing counter 52.

Figure 3:
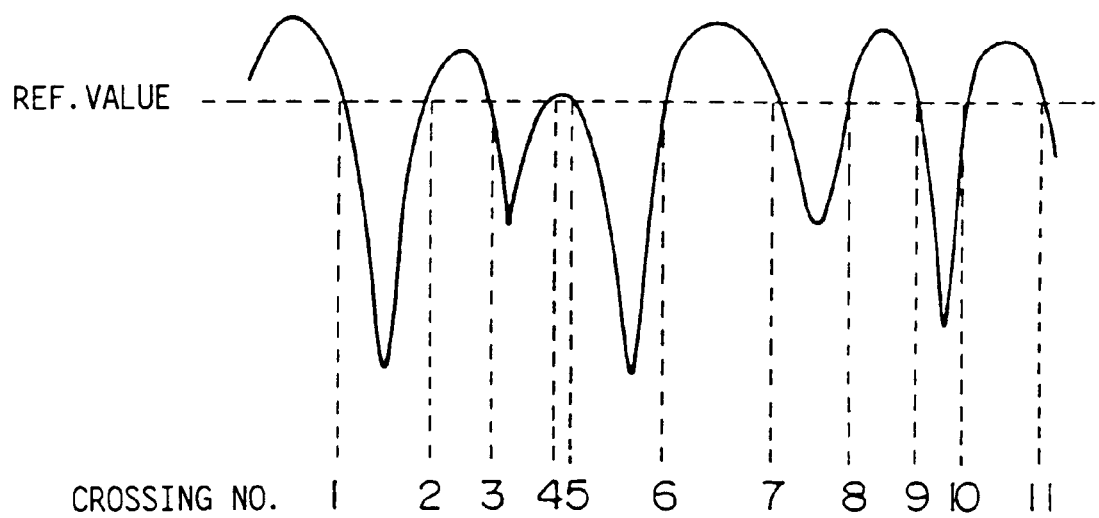
FIG. 3 is a diagram for explaining the operation of the first embodiment of the moving speed inferring unit.

As shown in FIG. 3, the crossing counter 52 counts the number of times the RSSI waveform crosses the reference value per unit time. This number of times crossed (that is, the number of crossings) for every unit time is supplied to a speed inferring circuit 54 which converts the number of times crossed into a moving speed, and speed data of the obtained moving speed is supplied to the transmission power controller 38.

Because the number of crossings is counted using the root-mean-square of the instantaneous value of the RSSI as the reference value, the number of crossings is equal to the Doppler frequency when the unit time is 1 second. This may be understood from the following formula, where $N_{RS}$ denotes a crossing level number, $R_S$ denotes a level, and $b_0$ denotes an average reception power.

$$N_{RS} = \sqrt{2\pi} \cdot f_D \cdot \{(R_S/(\sqrt{2 b_0})\} \cdot \exp(-R_S/2b_0)^2$$

By setting the crossing level equal to the root of the average reception power, that is $R_S = \sqrt{b_0}$, it is possible to obtain the following formula.

$$N_{RS,\max} = f_D \sqrt{\pi} \exp(1/2)$$
$$\approx f_D$$

Therefore, by using a conversion table of the Doppler frequency and the varying width in the transmission power controller 38, it is possible to integrate the speed inferring circuit 54 and the transmission power controller 38 into one unit.

Figure 4:
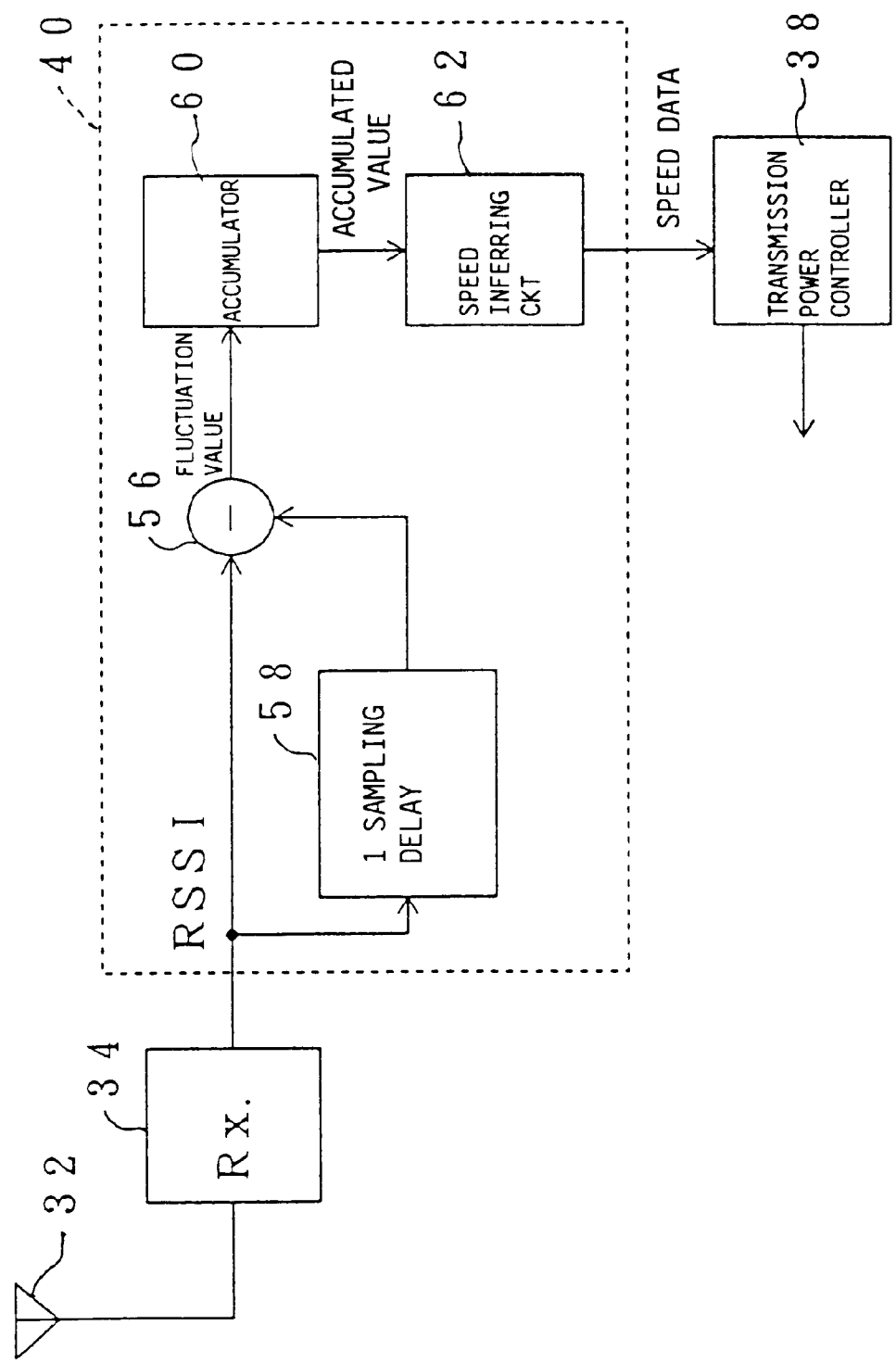
FIG. 4 is a system block diagram showing a second embodiment of the moving speed inferring unit.

FIG. 4 shows a second embodiment of the moving speed inferring unit 40. In FIG. 4, the RSSI output from the receiver 34 is supplied directly to a subtracter 56 on one hand, and is supplied to the subtracter 56 after being delayed by 1 sampling time in a 1 sampling delay circuit 58 on the other. The subtracter 58 obtains a fluctuation value of the RSSI for 1 sampling time. This fluctuation value is supplied to an accumulator 60 which accumulates absolute values of the fluctuation values per unit time.

Figure 5A:
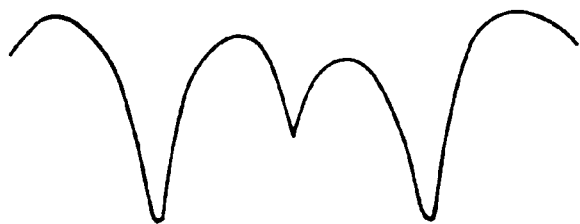
FIGS. 5A and 5B respectively are diagrams for explaining the operation of the second embodiment of the moving speed inferring unit.
Figure 5B:

The RSSI waveform becomes as shown in FIG. 5A when the moving speed is large, and the accumulated value becomes large. On the other hand, the RSSI waveform becomes as shown in FIG. 5B when the moving speed is small, and the accumulated value becomes small. A speed inferring circuit 62 infers the moving speed from the accumulated value, and supplies the obtained speed data to the transmission power controller 38. By using a conversion table of the accumulated value and the varying width in the transmission power controller 38, it is possible to integrate the speed inferring circuit 62 and the transmission power controller 38 into one unit.

Figure 6:
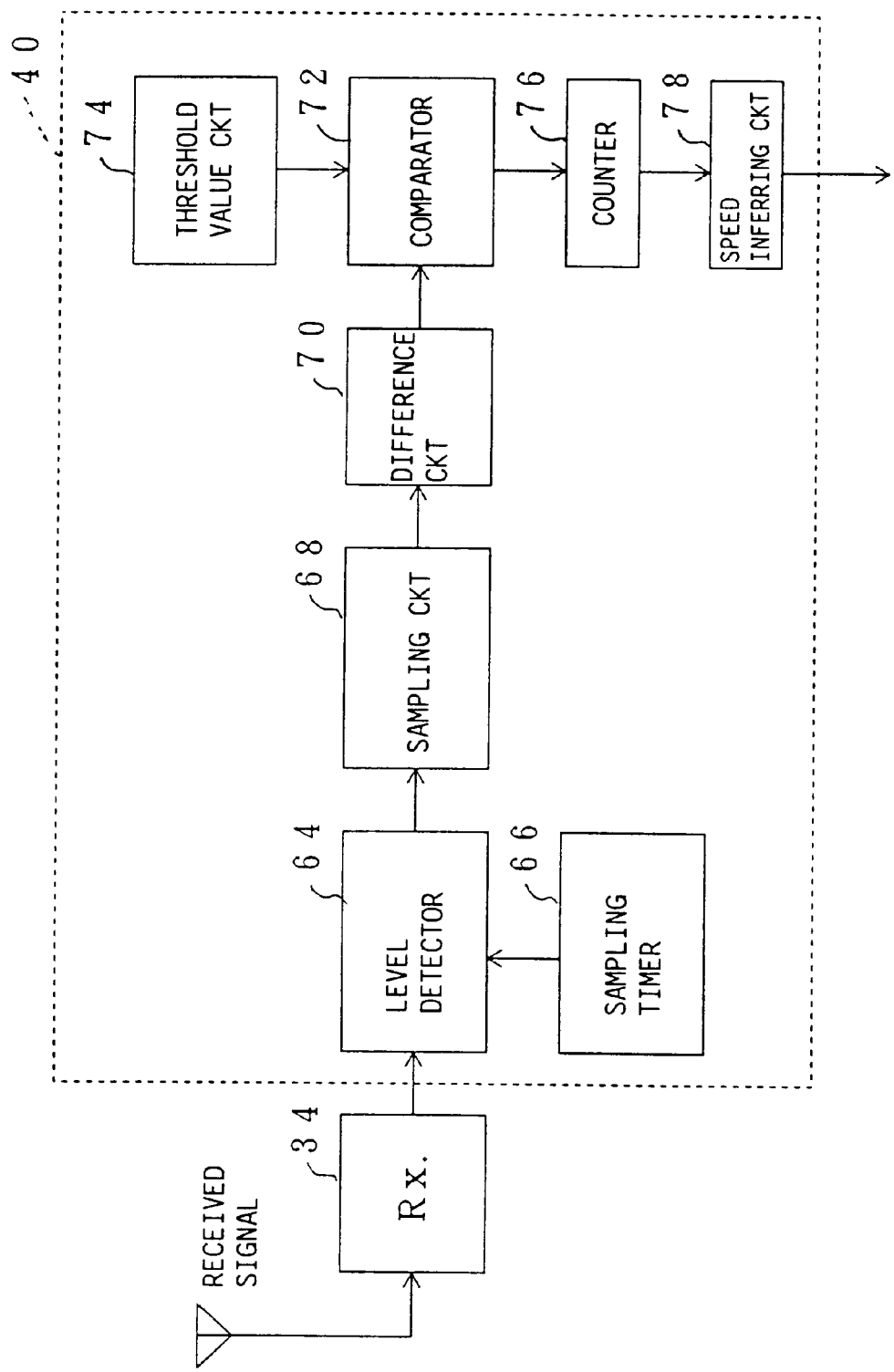
FIG. 6 is a system block diagram showing a third embodiment of the moving speed inferring unit.
Figure 7:
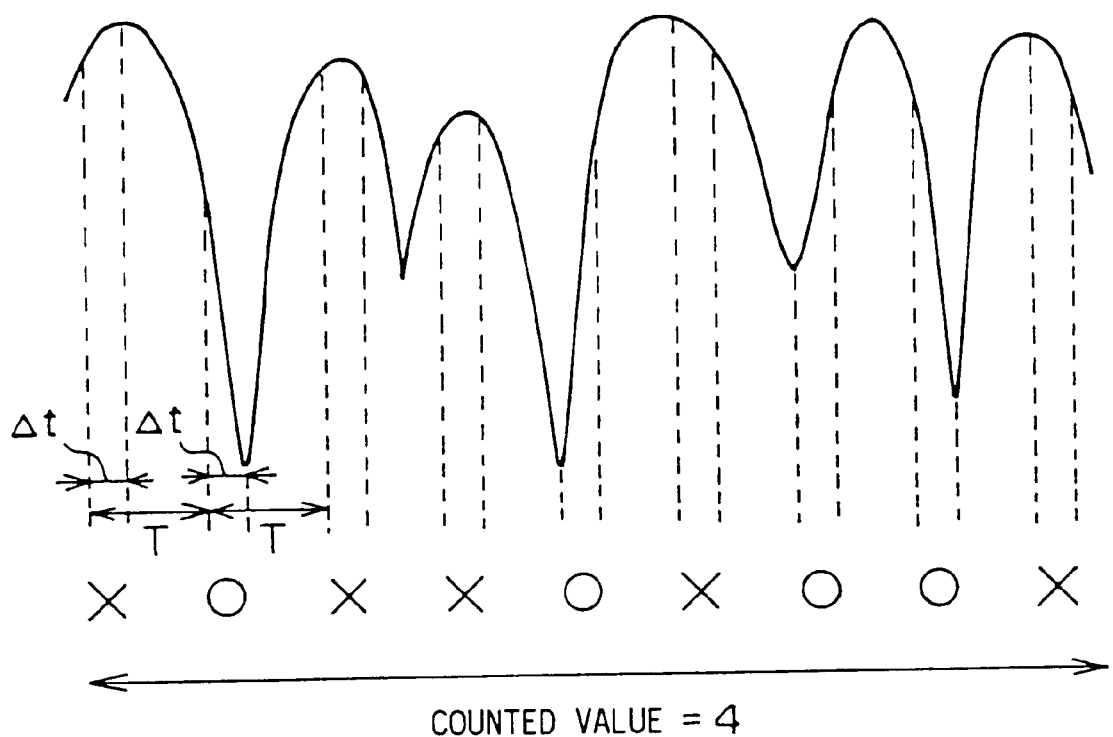
FIG. 7 is a diagram for explaining the operation of the third embodiment of the moving speed inferring unit.

FIG. 6 shows a third embodiment of the moving speed interring unit 40. In FIG. 6, the RSSI having a waveform indicated by a solid line in FIG. 7 is output from the receiver 34 and is supplied to a level detector 64. The level detector 64 detects the level of the RSSI signal at a sampling interval T, which is specified by a sampling timer 66. The detected level is supplied to a difference circuit 70 via a sampling circuit 68, and the difference circuit 70 calculates a level difference during a predetermined time $_\Delta t$, which is determined by the sampling circuit 68. The calculated level difference is supplied to a comparator 72.

The comparator 72 compares the level difference and a predetermined threshold value received from a threshold circuit 74, and generates and supplies a pulse to a counter 76 when the level difference is larger than the predetermined threshold value. In FIG. 7, portions where the level difference exceeds the predetermined threshold value are indicated by symbols "o", and portions where the level difference is less than or equal to the predetermined threshold value are indicated by symbols "x". The counter 76 counts the pulses received from the comparator 72 per unit time, and supplies a counted value to a speed inferring circuit 78. The speed inferring circuit 78 infers the moving speed from the counted value, and the obtained speed data is supplied to the transmission power controller 38. By using a conversion table of the counted value and the varying width in the transmission power controller 38, it is possible to integrate the speed inferring circuit 78 and the transmission power controller 38 into one unit.

Figure 8:
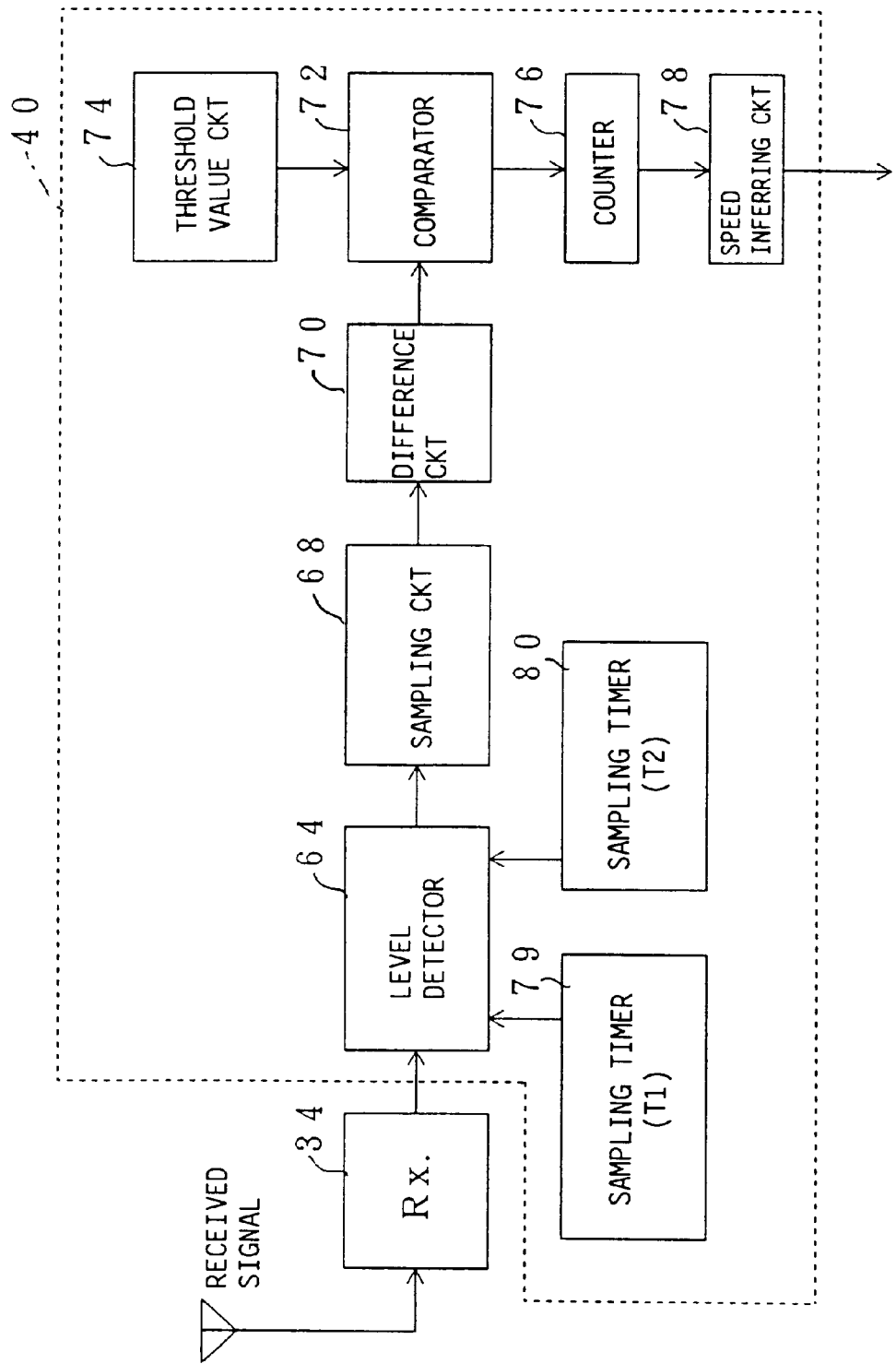
FIG. 8 is a system block diagram showing a modification of the third embodiment of the moving speed inferring unit.
Figure 9:
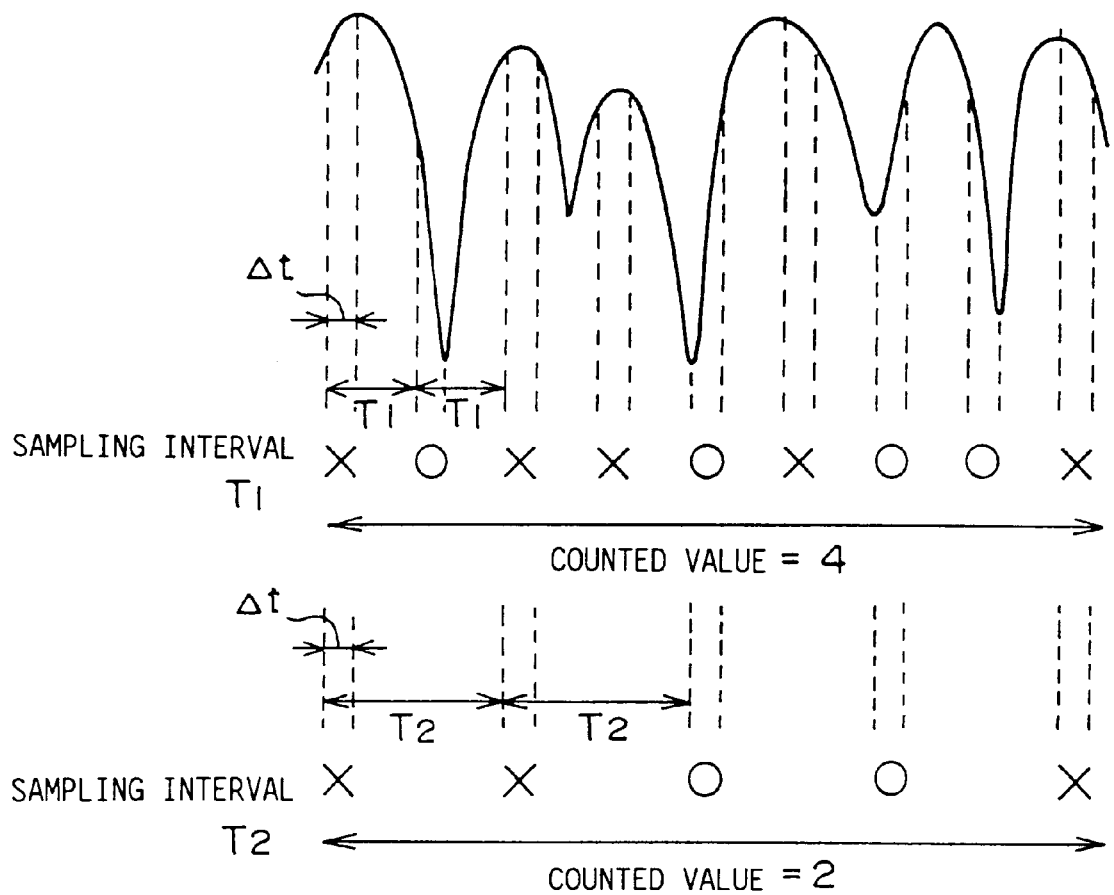
FIG. 9 is a diagram for explaining the operation of the modification of the third embodiment of the moving speed inferring unit.

FIG. 8 shows a modification of the third embodiment of the moving speed interring unit 40. In FIG. 8, the RSSI having the waveform indicated by a solid line in FIG. 9 is output from the receiver 34 and is supplied to a level detector 64. The level detector detects the level of the RSSI signal during a sampling interval $T_1$ which is specified by a sampling timer 79 or during a sampling interval $T_2$ specified by a sampling timer 80. The detected level is supplied to a difference circuit 70 via a sampling circuit 68, and the difference circuit 70 calculates a level difference during a predetermined time $_\Delta t$ which is determined by the sampling circuit 68. The calculated level difference is supplied to a comparator 72.

The comparator 72 compares the level difference and a predetermined threshold value received from a threshold circuit 74, and generates and supplies a pulse to a counter 76 when the level difference is larger than the predetermined threshold value. In FIG. 9, portions where the level difference exceeds the predetermined threshold value are indicated by symbols "o", and portions where the level difference is less than or equal to the predetermined threshold value are indicated by symbols "x". The counter 76 counts the pulses received from the comparator 72 per unit time, and supplies a counted value to a speed inferring circuit 78. The speed inferring circuit 78 infers the moving speed from the counted value, and the obtained speed data is supplied to the transmission power controller 38. In FIG. 9, the sampling interval $T_1$ is used since the sampling interval $T_2$ is too long.

In this modification, a plurality of sampling intervals are provided and a suitable sampling interval is selectively used. For this reason, it is possible to infer the moving speed with a high accuracy in a wide speed range from a low speed to a high speed, and to vary the varying width of the transmission power.

According to each of the moving speed inferring units 40 described heretofore, the moving speed is inferred from the RSSI which is output from the receiver 34. Next, a description will be given of embodiments of the moving speed inferring unit 40 which infer the moving speed without the use of the RSSI.

Figure 10:
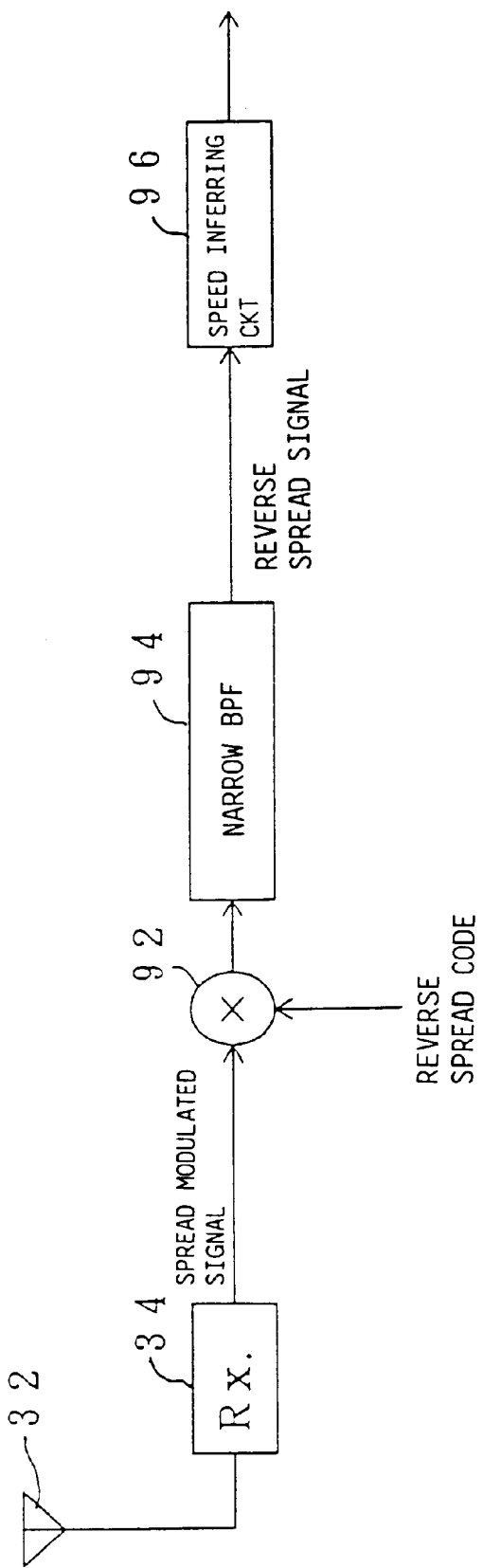
FIG. 10 is a system block diagram showing a fourth embodiment of the moving speed inferring unit.

FIG. 10 shows a fourth embodiment of the moving speed inferring unit 40. In FIG. 10, a spread modulated signal received by a receiver 34 of the mobile communication terminal is supplied to a multiplier 92. The multiplier 92 also receives a reverse spread signal and carries out a reverse spread. A reverse spread signal output from the multiplier 92 is supplied to a speed inferring circuit 96 via a narrow bandpass filter 94. The speed inferring circuit 96 infers the moving speed from the level fluctuation of the reverse spread signal, and supplies the inferred moving speed to the transmission power controller 38. The speed inferring circuit 96 infers that the moving speed is lower as the level fluctuation of the reverse spread signal becomes larger.

Figure 11:
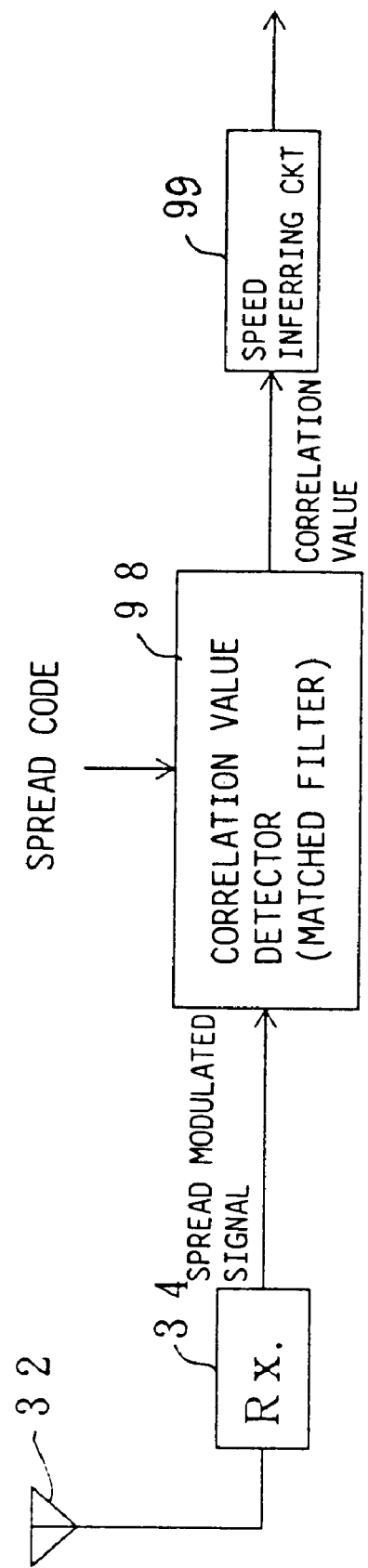
FIG. 11 is a system block diagram showing a fifth embodiment of the moving speed inferring unit.

FIG. 11 shows a fifth embodiment of the moving speed inferring unit 40. In FIG. 11, the spread modulated signal received by the receiver 34 of the mobile communication terminal is supplied to a correlation value detector 98. The correlation value detector 98 also receives a spread code, and detects a correlation value of the spread modulated signal and the spread code (signal). The correlation value output from the correlation value detector 98 is supplied to a speed inferring circuit 99. The speed inferring circuit 99 infers the moving speed depending on the fluctuation of the correlation value so that the moving speed becomes lower as the fluctuation of the correlation value becomes larger. The inferred moving speed is supplied from the speed inferring circuit 99 to the transmission power controller 38.

Figure 12:
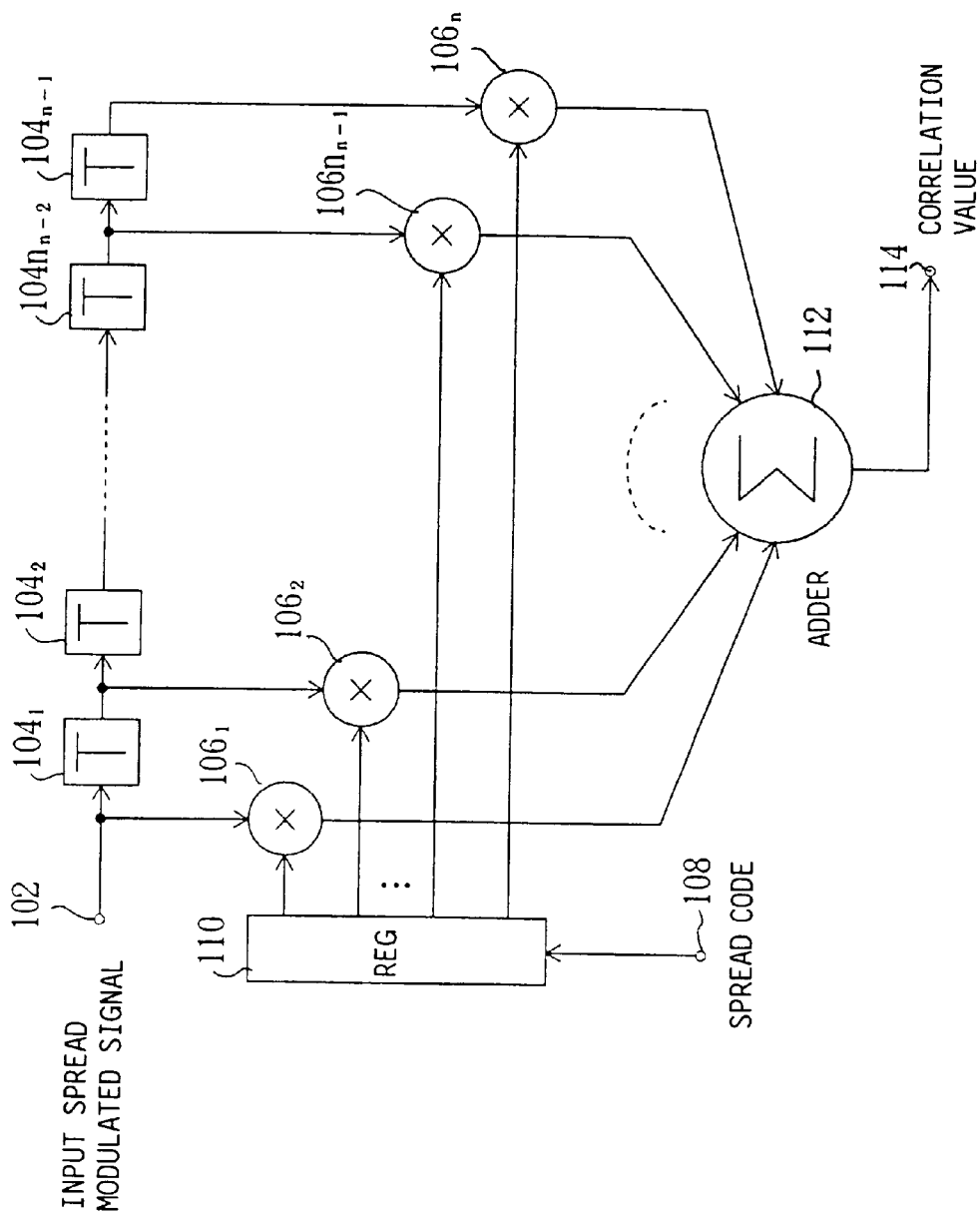
FIG. 12 is a system block diagram showing the construction of a correlation value detector shown in FIG. 11.

FIG. 12 shows the construction of a matched filter which is used as the correlation value detector 98. In FIG. 12, the spread modulated signal input to a terminal 102 is supplied to a multiplier $106_1$ and a unit delay element $104_1$. An output of the unit delay element $104_1$ is successively supplied to unit delay elements $104_2$ through $104_{n-1}$. An output of a unit delay element $104_i$ is supplied to a multiplier $106_{i+1}$, where i=1, 2, . . . , n-1. In addition, the spread code input to a terminal 108 is stored in a register 110, and bits of the spread core are supplied to the corresponding multipliers $106_1$ through $106_n$ and multiplied with the spread modulated signal or the delayed spread modulated signal. Output values of the multipliers $106_1$ through $106_n$ are added in an adder 112, and an output of the adder 112 is output via a terminal 114 as the correlation value. In the fourth and fifth embodiments of the speed inferring unit 40, the varying width of the transmission power is varied depending on the fluctuation of the reverse spread signal or the correlation value, and thus, it is possible to infer the moving speed even if the fluctuation of the reception level is buried in thermal noise when the signal level at the receiver 34 is lower than the thermal noise level of the receiver 34.

In the DS-CDMA, a pilot signal which is used for synchronization detection and the like is transmitted from the base station to each of the mobile communication terminals. As methods of transmitting the pilot signal, there are the extrapolation technique and the interpolation technique. According to the extrapolation technique, a pilot signal is transmitted by carrying out a narrow band modulation using a signal having all "0"s or all "1"s, and carrying out a spread modulation. On the other hand, according to the interpolation technique, a pilot signal is transmitted by inserting the pilot signal having all "0"s or all "1"s by a time division multiplexing with information, and carrying out a narrow band modulation and a spread modulation together with the information data.

Figure 13:
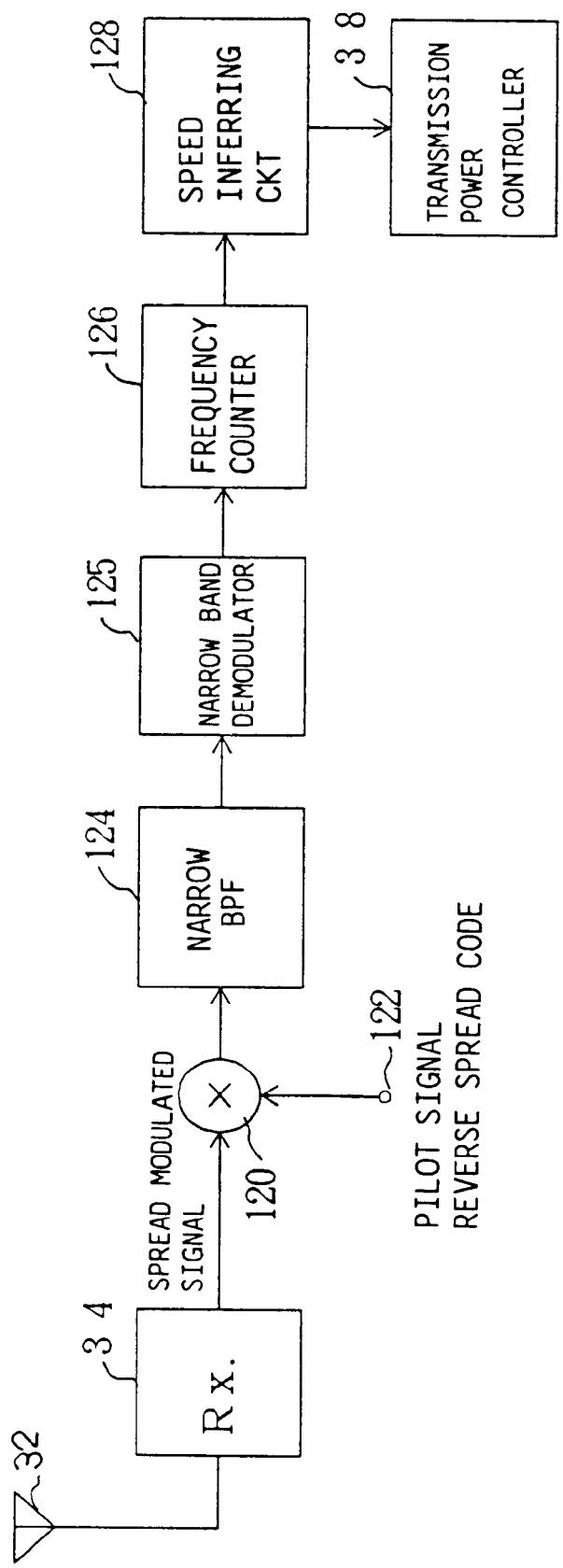
FIG. 13 is a system block diagram showing a sixth embodiment of the moving speed inferring unit.

FIG. 13 shows a sixth embodiment of the moving speed inferring unit 40. In this embodiment, the pilot signal is transmitted using the extrapolation technique. In FIG. 13, the spread modulated signal received from the receiver 34 of the mobile communication terminal is supplied to a multiplier 120. The multiplier 120 also receives a reverse spread code of the pilot signal from a terminal 122, and carries out a reverse spread. A narrow band modulated pilot signal which is output from the multiplier 120 is supplied to a narrow band demodulator 125 via a narrow bandpass filter 124. The narrow band demodulator 125 carries out a narrow band demodulation with respect to the narrow band modulated pilot signal, and an output pilot signal of the narrow band demodulator 125 is supplied to a frequency counter 126.

The pilot signal supplied to the frequency counter 126 has all "0"s or all "1"s if no instantaneous fluctuation exists. However, as the moving speed becomes high and the instantaneous fluctuation becomes faster, the demodulated pilot signal value changes from "0" to "1" and from "1" to "0", and the number of changes becomes larger as the instantaneous fluctuation becomes faster. The frequency counter 126 counts the frequency at which the pilot signal value changes, and supplies a counted value to a speed inferring circuit 128. The speed inferring circuit 128 converts the counted value, that is, the frequency, into the moving speed, and supplies the obtained speed data to the transmission power controller 38.

Figure 14:
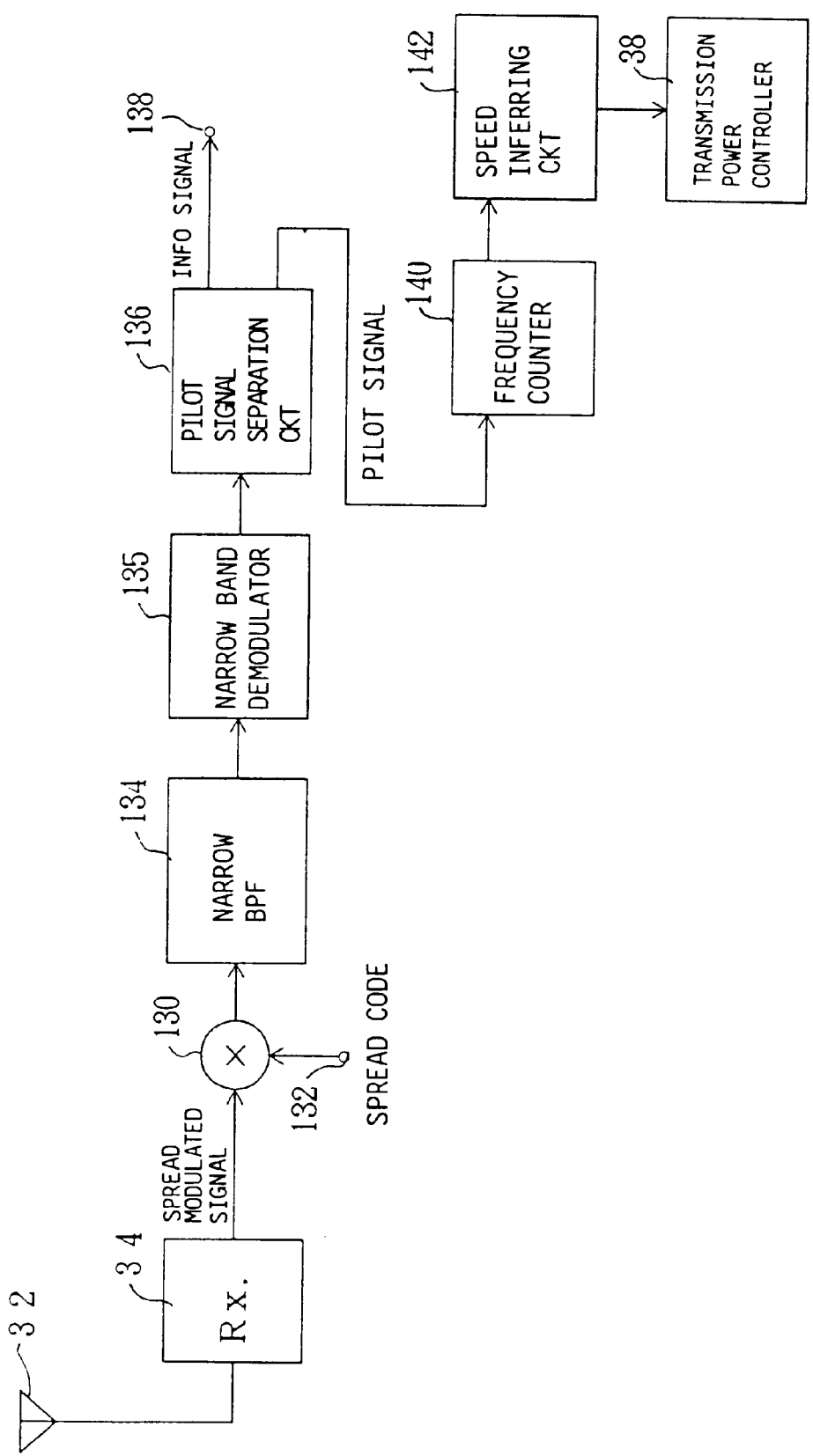
FIG. 14 is a system block diagram showing a seventh embodiment of the moving speed inferring unit.

FIG. 14 shows a seventh embodiment of the moving speed inferring unit 40. In this embodiment, the pilot signal is transmitted using the interpolation technique. In FIG. 14, the spread modulated signal received by the receiver 34 of the mobile communication terminal is supplied to a multiplier 130. This multiplier 130 also receives from a terminal 132 a reverse spread code of the mobile communication terminal to which the multiplier 130 belongs, and carries out a reverse spread. A narrow band modulated signal output from the multiplier 130 is supplied to a narrow band demodulator 135 via a narrow bandpass filter 134. The narrow band demodulator filter 135 carries out a narrow band demodulation, and an output of the narrow bandpass filter 134 is supplied to a pilot signal separation circuit 136. The pilot signal separation circuit 136 separates the pilot signal which is inserted into the reproduced information data by the interpolation technique, and outputs reproduced information data via a terminal 138. On the other hand, the separated pilot signal is supplied to a frequency counter 140.

The pilot signal supplied to the frequency counter 140 has all "0"s or all "1"s if no instantaneous fluctuation exists. However, as the moving speed becomes high and the instantaneous fluctuation becomes faster, the demodulated pilot signal value changes from "0" to "1" and from "1" to "0", and the number of changes becomes larger as the instantaneous fluctuation becomes faster. The frequency counter 140 counts the frequency at which the pilot signal value changes, and supplies a counted value to a speed inferring circuit 142. The speed inferring circuit 142 converts the counted value, that is, the frequency, into the moving speed, and supplies the obtained speed data to the transmission power controller 38.

Of course, in each of the embodiments of the speed inferring unit 40 shown in FIGS. 10 through 14, it is possible to integrate the speed inferring circuit and the transmission power controller into one unit by appropriately setting the conversion table.

If the receiver of the base station has diversity, the varying width of the transmission power is controlled by taking diversity information into consideration. The diversity may be categorized into space diversity and path diversity of rake reception. The space diversity information includes the antenna number, while the path diversity information includes the path synthesizing number, and the effect of suppressing the instantaneous fluctuation of the transmission power becomes larger as such numbers become larger, thereby making the varying width of the transmission power narrower. The mobile communication terminal obtains the diversity information when an access is made to the base station.

Figure 15:
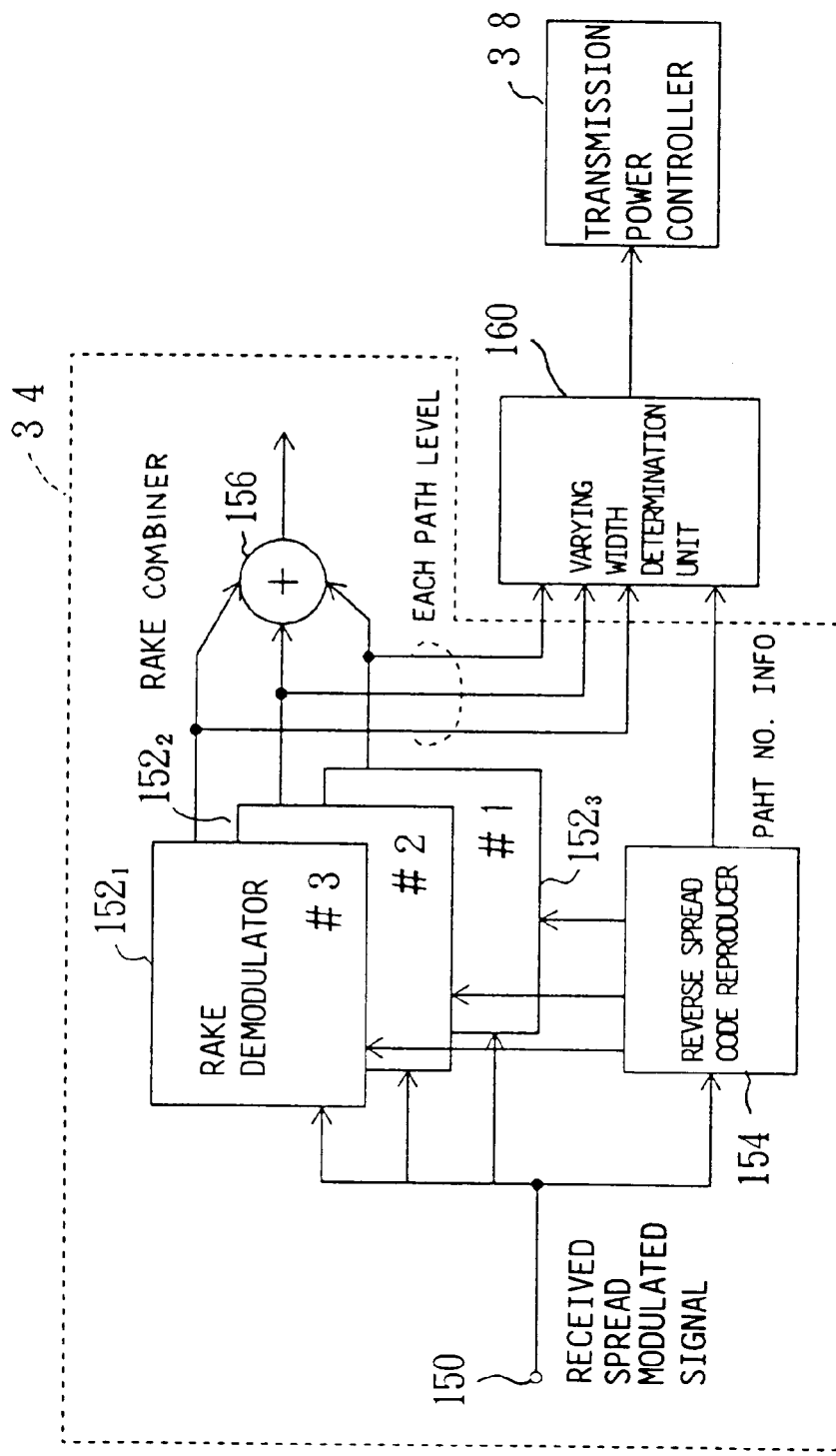
FIG. 15 is a system block diagram showing a part of a second embodiment of the mobile communication terminal using a rake receiver.

FIG. 15 shows a part of a second embodiment of the mobile communication terminal according to the present invention using a rake receiver as the receiver 34. This embodiment of the mobile communication terminal employs a second embodiment of the transmission power control method according to the present invention.

In FIG. 15, a spread modulated signal received by a terminal 150 is supplied to rake demodulators $152_1$ through $152_3$ and to a reverse spread code reproducer 154. The reverse spread code reproducer 154 reproduces reverse spread codes by setting delay times dependent on each of a plurality of paths, and supplies the reverse spread codes to the rake demodulators $152_1$ through $152_3$. The rake demodulators $152_1$ through $152_3$ respectively demodulate (reverse spread) the reverse spread codes having mutually different delay times, and supply narrow band modulated signals to a rake combiner 156. The rake combiner 156 synthesizes the narrow band modulated signals, and supplies a synthesized signal to a circuit in a subsequent stage.

The reverse spread code reproducer 154 supplies path number information of the received signal to a varying width determination unit 160. In addition, the rake demodulators $152_1$ through $152_3$ supply the levels of the narrow band modulated signals to the varying width determination unit 160. The varying width determination unit 160 determines the varying width of the transmission power depending on a path number and a path level ratio, and supplies the varying width to the transmission power controller 38. The path level ratio is the ratio of the reception levels in the paths. In a case where the receiver 34 has the space diversity in addition to the path diversity, the varying width is varied by adding the path number and the level difference of each path from a rake receiver which is provided in another system.

Figure 16:
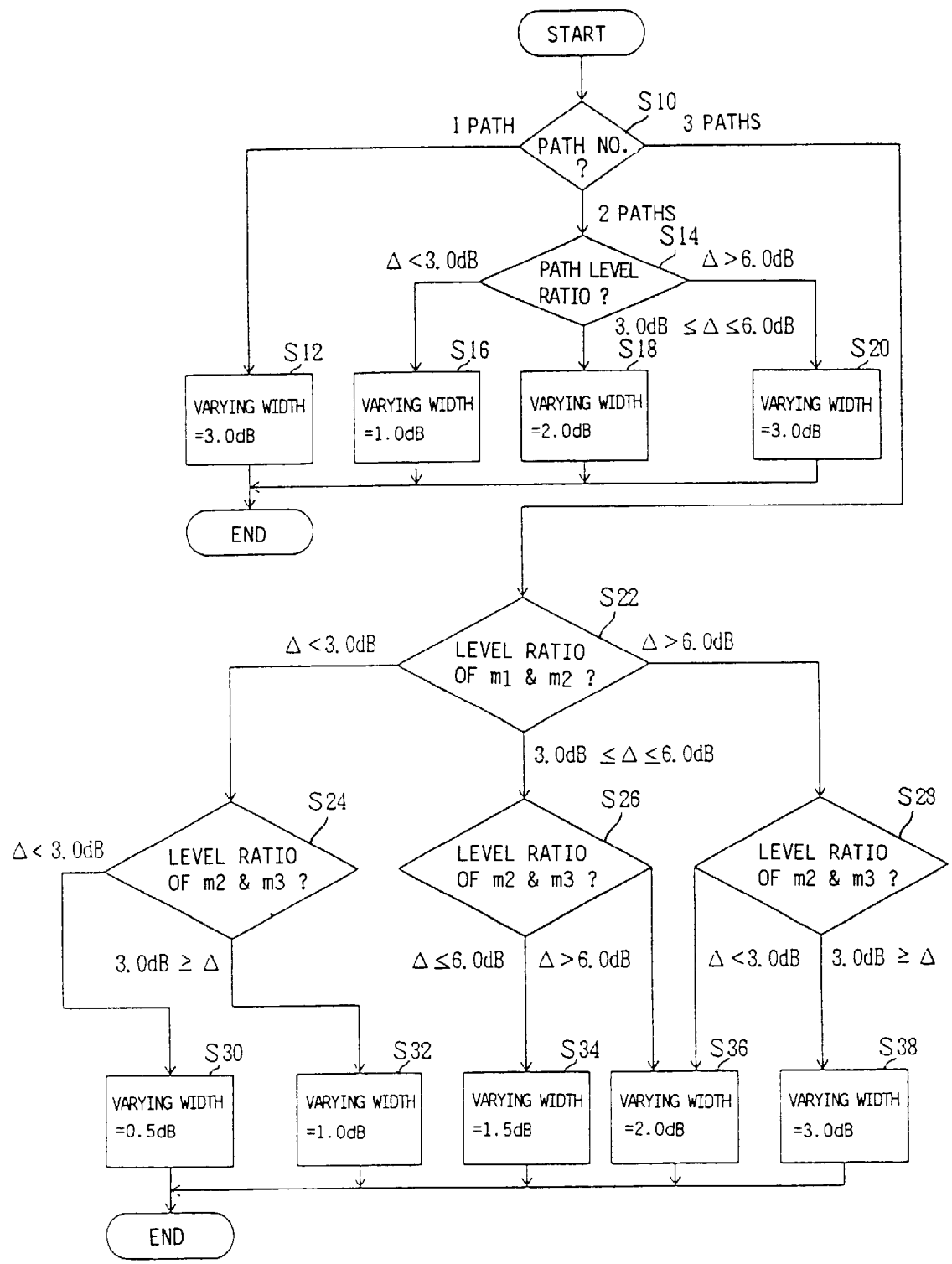
FIG. 16 is a flow chart for explaining the operation of a varying width determination unit shown in FIG. 15.

FIG. 16 is a flow chart for explaining the operation of the varying width determination unit 160. In FIG. 16, a step S10 discriminates the path number, that is, the number of paths. If the discriminated path number is 1, a step S12 sets the varying width of the transmission power to 3.0 dB. If the discriminated path number is 2, a step S14 discriminates the path level ratio $_A$ between the paths. If the path level ratio $_A$ is less than 3.0 dB, a step S16 sets the varying width to 1.0 dB. If the path level ratio $_A$ is greater than or equal to 3.0 dB but less than or equal to 6.0 dB, a step S18 sets the varying width to 2.0 dB. Further, if the path level ratio $_A$ is greater than 6.0 dB, a step S20 sets the varying width to 3.0 dB.

In addition, if the path number discriminated in the step S10 is 3, a step S22 discriminates the path level ratio $_A$ between a path m1 having the largest level and a path m2 having a second largest level. The process advances to a step S24 if this discriminated path level ratio $_A$ is less than 3.0 dB, and the process advances to a step S26 if the discriminated path level ratio is greater than or equal to 3.0 dB but less than or equal to 6.0 dB. Further, the process advances to a step S28 if the discriminated path level ratio $_A$ is greater than 6.0 dB.

The step S24 discriminates the path level ratio $_A$ between the second largest level of the path m2 and a third largest level of a path m3. A step S30 sets the varying width to 0.5 dB if the path level ratio $_A$ is less than 3.0 dB, and a step S32 sets the varying width to 1.0 dB if the path level ratio $_A$ is greater than or equal to 3.0 dB.

The step S26 discriminates the path level ratio $_A$ between the second largest level of the path m2 and the third largest level of the path m3. A step S34 sets the varying width to 1.5 dB if the path level ratio $_A$ is less than or equal to 6.0 dB, and a step S36 sets the varying width to 2.0 dB if the path level ratio $_A$ is greater than 6.0 dB.

The step S28 discriminates the path level ratio $_A$ between the second largest level of the path m2 and the third largest level of the path m3. The step S36 sets the varying width to 1.5 dB if the path level ratio $_A$ is less than 3.0 dB, and a step S38 sets the varying width to 3.0 dB if the path level ratio $_A$ is greater than or equal to 3.0 dB.

Figure 17:
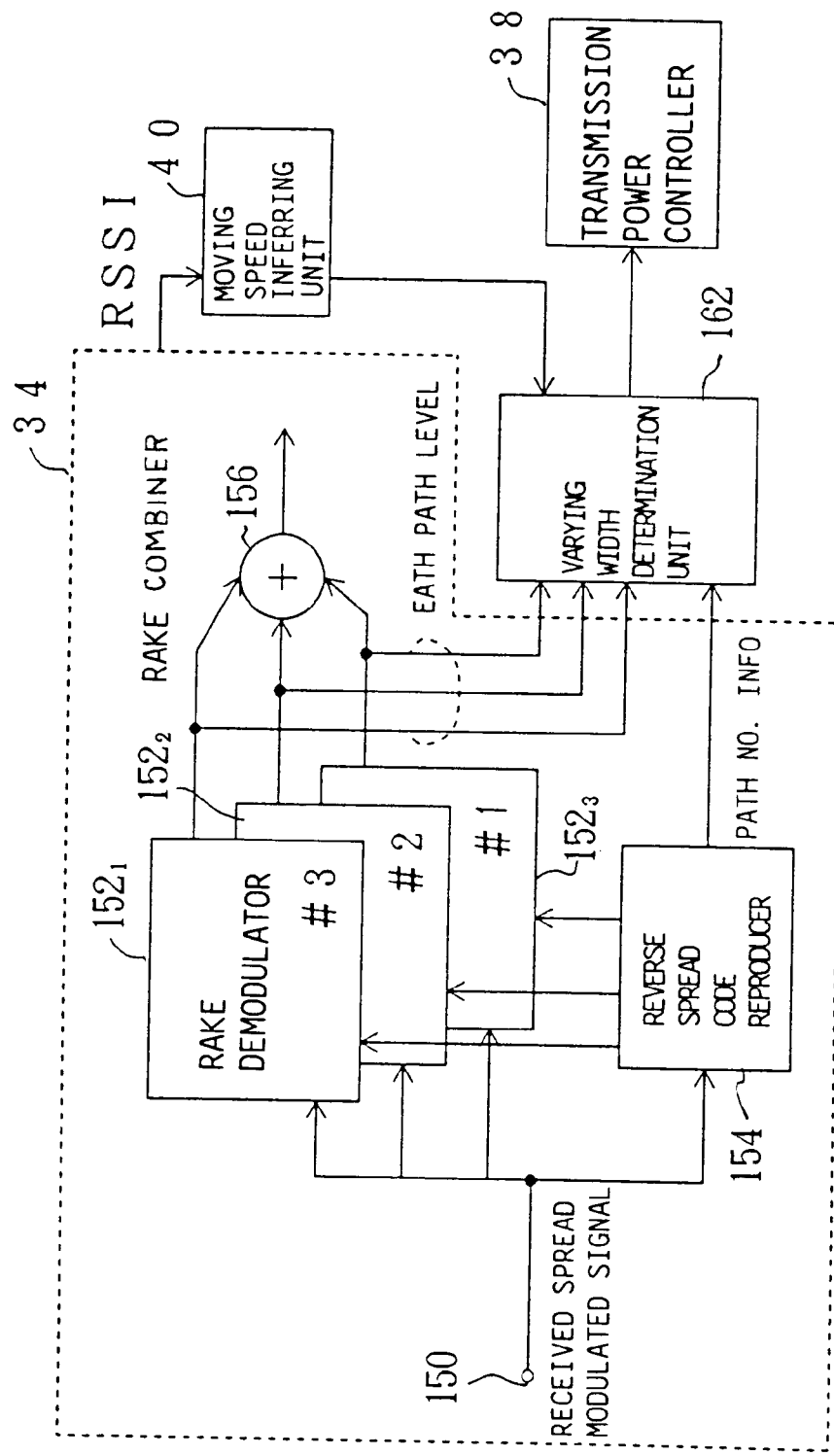
FIG. 17 is a system block diagram showing a part of a third embodiment of the mobile communication terminal using the rake receiver.

FIG. 17 shows a part of a third embodiment of the mobile communication terminal according to the present invention using a rake receiver as the receiver 34. This embodiment of the mobile communication terminal employs a third embodiment of the transmission power control method according to the present invention.

In FIG. 17, the spread modulated signal received by a terminal 150 is supplied to rake demodulators $152_1$ through $152_3$ and to a reverse spread code reproducer 154. The reverse spread code reproducer 154 reproduces reverse spread codes by setting delay times dependent on each of a plurality of paths, and supplies the reverse spread codes to the rake demodulators $152_1$ through $152_3$. The rake demodulators $152_1$ through $152_3$ respectively demodulate (reverse spread) the reverse spread codes having mutually different delay times, and supply narrow band modulated signals to a rake combiner 156. The rake combiner 156 synthesizes the narrow band modulated signals, and supplies a synthesized signal to a circuit in a subsequent stage.

The reverse spread code reproducer 154 supplies path number information of the received signal to a varying width determination unit 162. In addition, the rake demodulators 152$_1$ through 152$_3$ supply the levels of the narrow band modulated signals to the varying width determination unit 162.

A moving speed inferring unit 40 receives the RSSI detected by the rake receiver 34 and infers the moving speed from the fluctuation of the RSSI. The inferred moving speed is supplied as speed data to the varying width determination unit 162. The varying width determination unit 162 sets the varying width of the transmission power depending on the inferred moving speed, and corrects the varying width depending on the path number and the path level ratio. The varying width determination unit 162 supplies the determined varying width to the transmission power controller 38.

Figure 18:
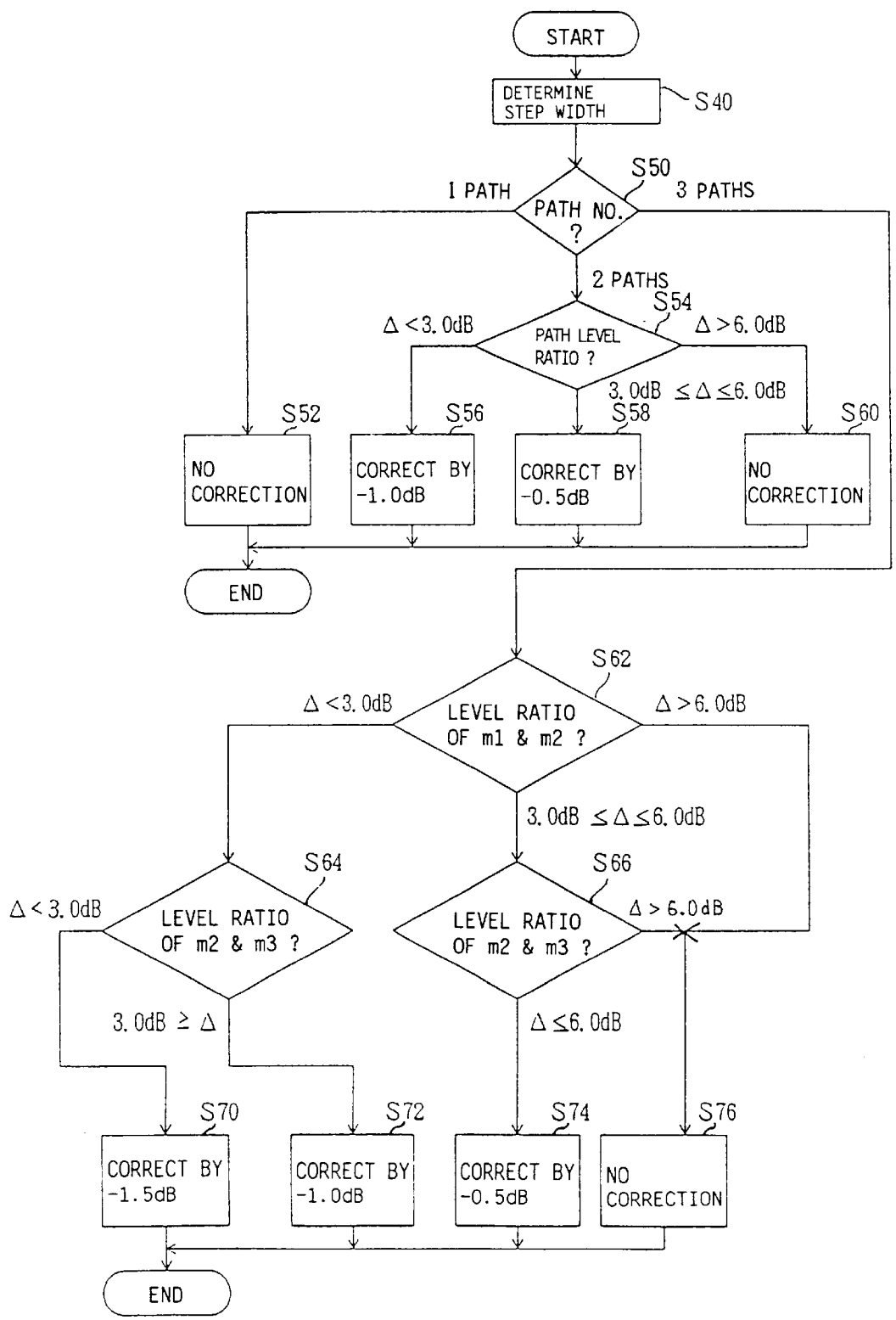
FIG. 18 is a flow chart for explaining the operation of a varying width determination unit shown in FIG. 17.

FIG. 18 is a flow chart for explaining the operation of the varying width determination unit 162. In FIG. 18, a step S40 sets the varying width to 2 dB if the inferred moving speed is described by the Doppler frequency of 10 Hz, for example, sets the varying width to 4 dB if the Doppler frequency is 60 Hz, and sets the varying width to 6 dB if the Doppler frequency is 120 Hz. A step S50 discriminates the path number. If the discriminated path number is 1, a step S52 makes no correction of the varying width. If the discriminated path number is 2, a step S54 discriminates the path level ratio $_A$. If the discriminated path level ratio $_A$ is less than 3.0 dB, a step S56 corrects the varying width by adding −1.0 dB to the set value. If the discriminated path level ratio $_A$ is greater than or equal to 3.0 dB but is less than or equal to 6.0 dB, a step S58 corrects the varying width by adding −0.5 dB to the set value. Further, if the discriminated path level ratio $_A$ is greater than 6.0 dB, a step S60 makes no correction of the varying width.

If the discriminated path number in the step S50 is 3, a step S62 discriminates the path level ratio $_A$ between the path m1 having the largest level and the path m2 having the second largest level. The process advances to a step S64 if the discriminated path level ratio $_A$ in the step S62 is less than 3.0 dB, and to a step S66 if the discriminated path level ratio $_A$ is greater than or equal to 3.0 dB but less than or equal to 6.0 dB. The process advances to a step S76 if the discriminated path level ratio $_A$ in the step S62 is greater than 6.0 dB.

The step S64 discriminates the path level ratio $_A$ between the path m2 having the second largest level and the path m3 having the third largest level. If the discriminated path level ratio $_A$ in the step S64 is less than 3.0 dB, a step S70 corrects the varying width by adding −1.5 dB to the set value. On the other hand, if the discriminated path level ratio $_A$ in the step S64 is greater than or equal to 3.0 dB, a step S72 corrects the varying width by adding −1.0 dB to the set value.

The step S66 discriminates the path level ratio $_A$ between the path m2 having the second largest level and the path m3 having the third largest level. If the discriminated path level ratio $_A$ in the step S66 is greater than 6.0 dB, the step S76 makes no correction of the varying width. On the other hand, if the discriminated path level ratio $_A$ in the step S66 is less than or equal to 6.0 dB, a step S74 corrects the varying width by adding −0.5 dB to the set value.

In FIG. 18, it is assumed for the sake of convenience that the varying width is variable in steps of 0.5 dB, however, the varying steps is of course not limited to such. In addition, the path level ratios among the paths m1, m2 and m3 and the varying widths are not limited to those used in FIG. 18.

Figure 19:
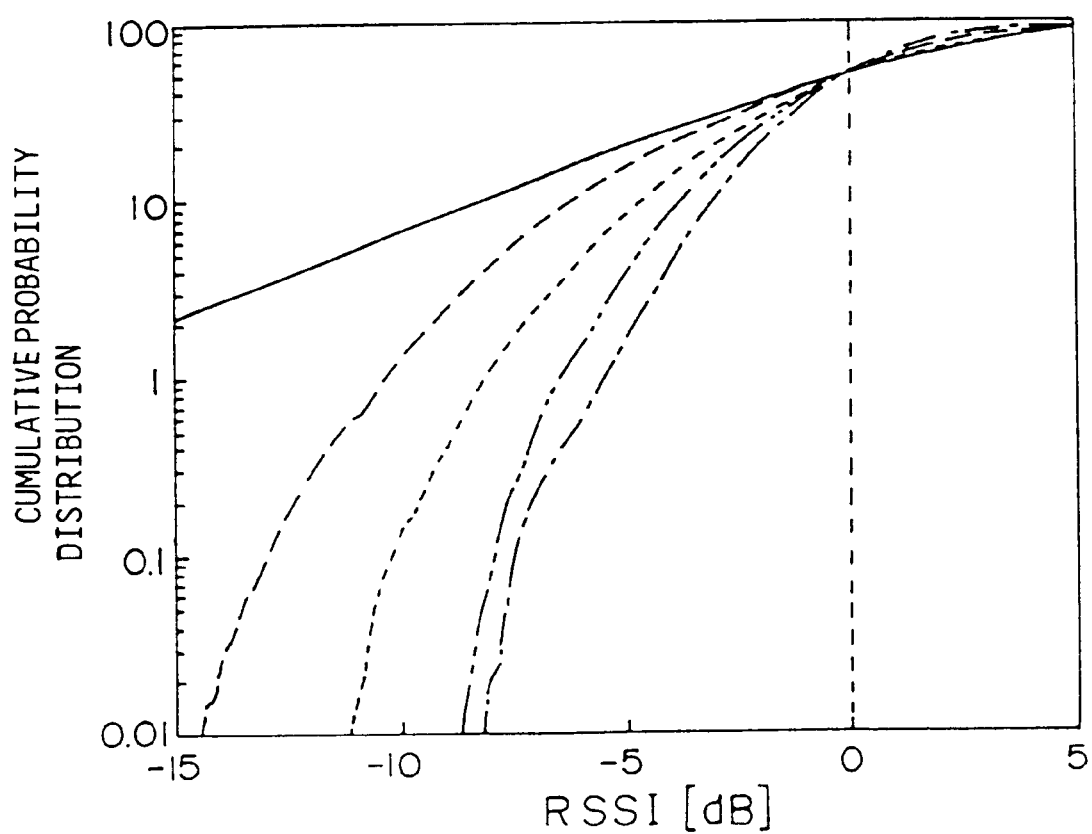
FIG. 19 is a diagram showing a DS-CDMA radio wave propagation characteristic.

FIG. 19 shows a radio wave propagation characteristic of the DS-CDMA. In FIG. 19, the Rayleigh distribution is indicated by a solid line. A broken line Ia indicates a characteristic curve for a case where the bandwidth is 1 MHz, a broken line Ib indicates a characteristic curve for a case where the bandwidth is 4 MHz, a broken line Ic indicates a characteristic curve for a case where the bandwidth is 8 MHz, and a broken line Id indicates a characteristic curve for a case where the bandwidth is 16 MHz. As may be seen from FIG. 19, the characteristic curve changes towards a direction in which the distribution width becomes smaller from the Rayleigh distribution as the bandwidth becomes wider. For this reason, it is possible to make the transmission power controller of the mobile communication terminal recognize the transmission and reception bandwidth when making a communication, so that the transmission power controller controls the varying width by itself.

Figure 20:
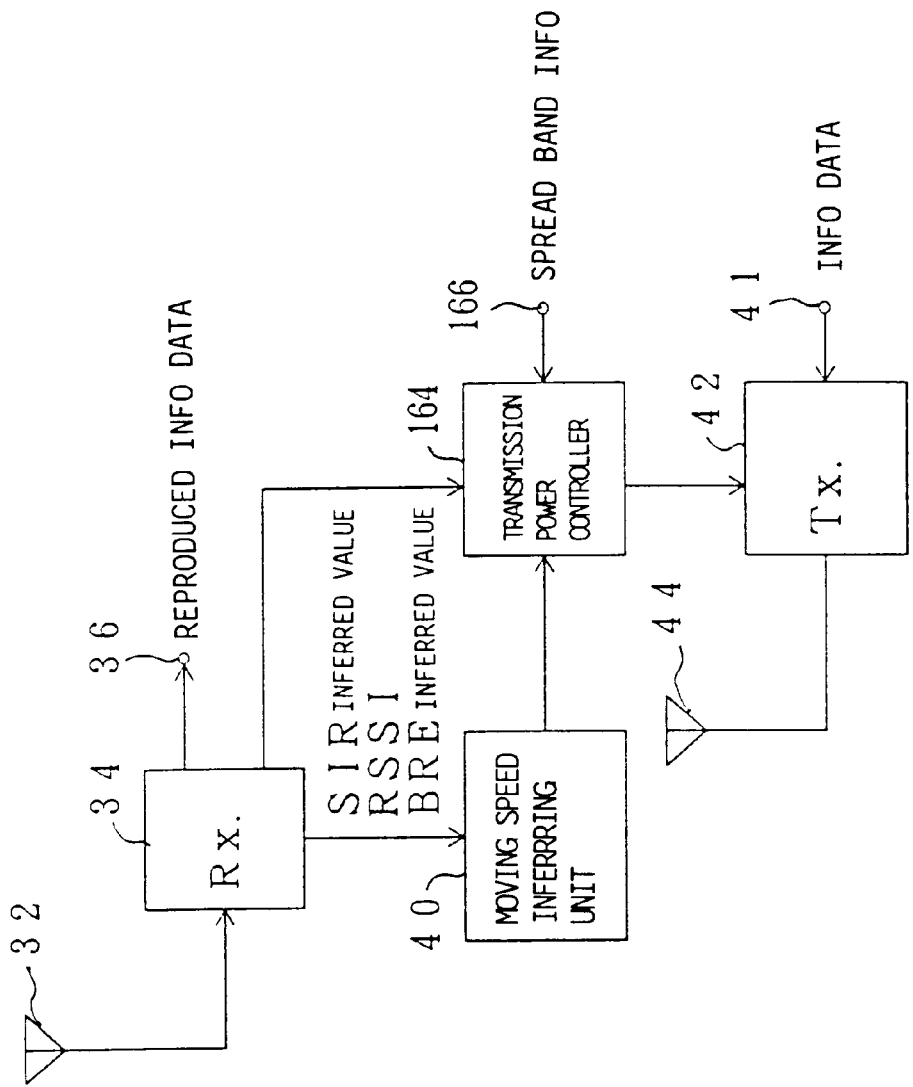
FIG. 20 is a system block diagram showing a fourth embodiment of the mobile communication terminal according to the present invention.

FIG. 20 shows a fourth embodiment of the mobile communication terminal according to the present invention. This embodiment of the mobile communication terminal employs a fourth embodiment of the transmission power control method according to the present invention. In FIG. 20, those parts which are the same as those corresponding parts in FIG. 1 are designated by the same reference numerals.

In FIG. 20, a mobile communication terminal (MS) receives a down-link signal by an antenna 32, and carries out a reverse spread and a narrow band demodulation in a receiver 34. Reproduced information data obtained in the receiver 34 are output via a terminal 36. In addition, a reproduced control command obtained in the receiver 34 is supplied to a transmission power controller 164. The receiver 34 also detects the RSSI, and the detected RSSI is supplied to a moving speed inferring unit 40.

The moving speed inferring unit 40 infers the moving speed from the change in the RSSI, and supplies the inferred moving speed as speed data to the transmission power controller 164. The transmission power controller 164 instructs the increasing or decreasing direction of the transmission power of a transmitter 42 based on the reproduced control command which is periodically supplied from the receiver 34. In addition, the transmission power controller 164 instructs the varying width (step quantity) of the transmission power of the transmitter 42 based on the speed data supplied from the moving speed inferring unit 40. For example, the increasing direction of the transmission power is indicated when the reproduced control command has a value "1", and the decreasing direction of the transmission power is indicated when the reproduced control command has a value "0". In addition, the varying width is set to 0.5 dB when the inferred moving speed (Doppler frequency) is 0 km/h (0 Hz), set to 1.0 dB when the inferred moving speed (Doppler frequency) is 20 km/h (37 Hz), set to 2.5 dB when the inferred moving speed (Doppler frequency) is 40 km/h (74 Hz), and set to 4.0 dB when the inferred moving speed (Doppler frequency) is 60 km/h (111 Hz), for example. Further, the transmission power controller 164 corrects the varying width depending on spread bandwidth information which is supplied from a terminal 166, and supplies a corrected varying width to the transmitter 42.

The transmitter 42 carries out a narrow band modulation using information data supplied from a terminal 41, and further carries out a spread modulation to transmit an up-link signal from an antenna 24. In this state, the transmission power of the transmitter 42 is varied in steps depending on the instruction from the transmission power controller 164.

Figure 21:
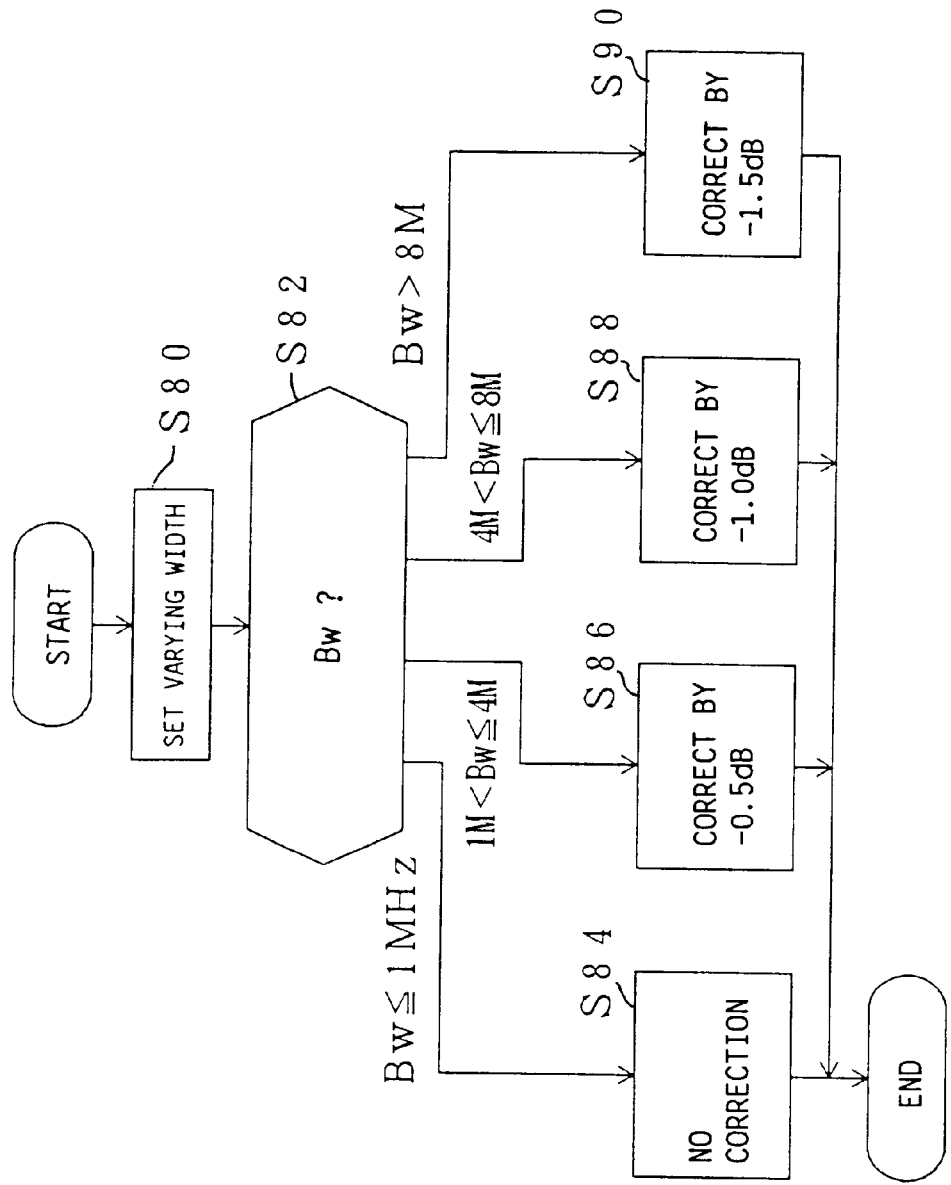
FIG. 21 is a flow chart for explaining the operation of a transmission power controller shown in FIG. 20.

FIG. 21 is a flow chart for explaining the operation of the transmission power controller 164. In FIG. 21, a step S80 sets the varying width depending on the inferred moving speed which is supplied from the moving speed inferring unit 40. Then, a step S82 discriminates a spread bandwidth Bw. More particularly, the step S82 discriminates whether the spread bandwidth Bw is less than or equal to 1 MHz, greater than 1 MHz but less than or equal to 4 MHz, greater than 4 MHz but less than or equal to 8 MHz or, greater than 8 MHz.

A step S84 makes no correction of the varying width if the discriminated spread bandwidth Bw is less than or equal to 1 MHz. A step S86 corrects the varying width by adding −0.5 dB to the set value if the discriminated spread bandwidth Bw is greater than 1 MHz but less than or equal to 4 MHz. A step S88 corrects the varying width by adding −1.0 dB to the set value if the discriminated spread bandwidth Bw is greater than 4 MHz but less than or equal to 8 MHz. In addition, a step S90 corrects the varying width by adding −1.5 dB to the set value if the discriminated spread bandwidth Bw is greater than 8 MHz. It is assumed for the sake of convenience that the varying width is variable in steps of 0.5 dB in this embodiment.

Next, a description will be given of a fifth embodiment of the mobile communication terminal according to the present invention. This embodiment of the mobile communication terminal employs a fifth embodiment of the transmission power control method according to the present invention. This embodiment is applied to a system which transmits the pilot signal from the mobile communication terminal to the base station using the extrapolation technique.

Figure 22:
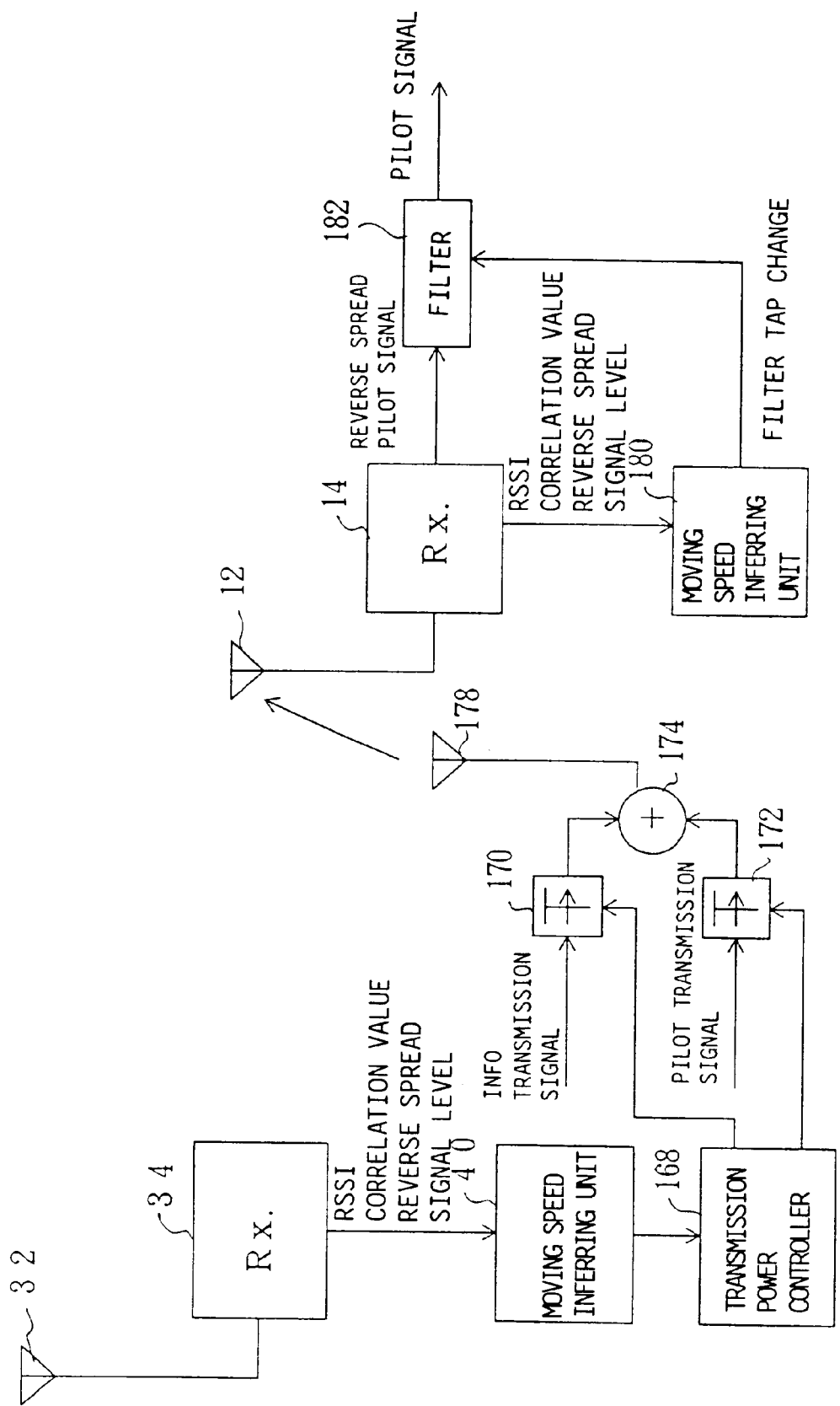
FIG. 22 is a system block diagram showing a fifth embodiment of the mobile communication terminal according to the present invention.

FIG. 22 shows the fifth embodiment of the mobile communication terminal. In FIG. 22, a moving speed inferring unit 40 of a mobile communication terminal (MS) infers the moving speed from the RSSI or the like detected by a receiver 34, and the inferred moving speed is supplied as speed data to a transmission power controller 168. The transmission power controller 168 variably controls the transmission power of a sum of an information data transmission signal and a pilot transmission signal, similarly to the transmission power controller 38 shown in FIG. 1. In addition, the transmission power controller 168 varies the ratio of the transmission power of the information data transmission signal with respect to the transmission power of the pilot transmission signal. In order to carry out such a control, the transmission power controller 168 supplies a control signal with respect to an attenuator 170 which receives the information data signal and supplies a control signal with respect to an attenuator 172 which receives the pilot transmission signal, so that the ratio of the transmission power of the pilot transmission signal becomes larger as the inferred moving speed becomes faster and the rate of the transmission power of the pilot transmission signal becomes smaller as the inferred moving speed becomes slower. The information data transmission signal passed through the attenuator 170 and the pilot transmission signal passed through the attenuator 172 are mixed in a mixer 174 and transmitted from an antenna 178.

The slower the moving speed, the narrower the narrow bandwidth of the pilot signal becomes at the base station for use in inferring the transmission path and detecting synchronization. Hence, the bandwidth of a filter (reverse spread filter) which separates the band of the reverse spread pilot signal can be made narrow, and a correct transmission path can be inferred at a low transmission power. As the moving speed becomes faster, the phase variation in the transmission path becomes larger, and it is necessary to make the transmission power higher because the bandwidth of the reverse spread filter for the pilot signal becomes wider.

In this embodiment, the moving speed of the mobile communication terminal is inferred in a moving speed inferring unit 180 of the base station (BS) based on the RSSI, the correlation value, the reverse spread signal level or the like. This moving speed inferring unit 180 controls the number of taps (stages) of a filter (reverse spread filter) 182 which separates the band of the reverse spread pilot signal so as to vary the passing bandwidth of the filter 182.

Figure 23:
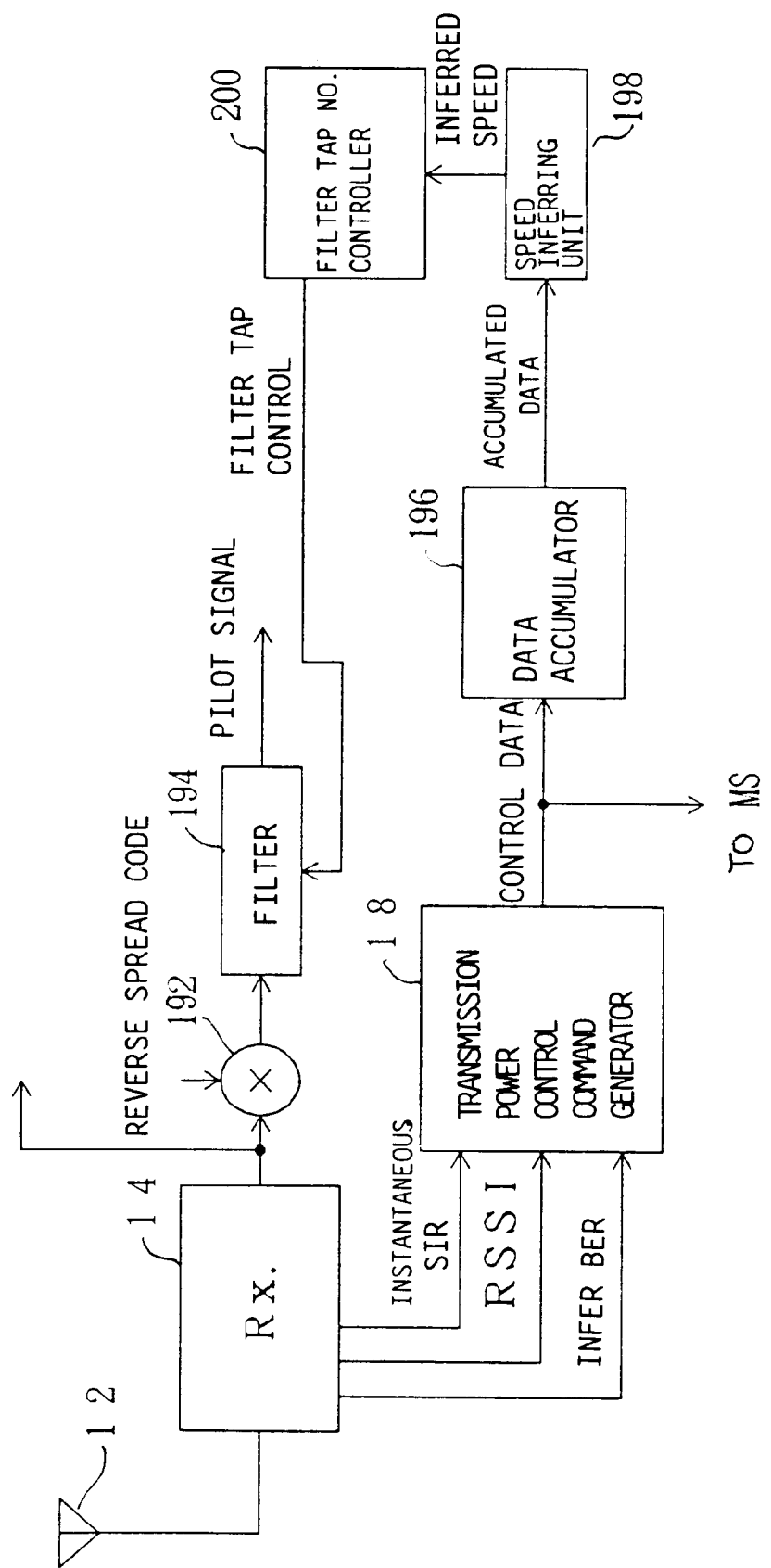
FIG. 23 is a system block diagram for explaining a reverse spread filter control at a base station.

FIG. 23 shows a reverse spread filter control at the base station. In FIG. 23, a signal received by an antenna 12 is supplied to a receiver 14, and is then supplied to a multiplier 192 which is provided to carry out a reverse spread. The multiplier 192 multiplies the received signal and a reverse spread code of a pilot signal of an arbitrary mobile communication terminal, and supplies a reverse spread signal to a filter 194. Of course, a plurality of other multipliers are provided to carry out a reverse spread of the pilot signal and the information data on the up-link of each of the mobile communication terminals. The RSSI, instantaneous SIR and BER detected in the receiver 14 are supplied to a transmission power control command generator 18 which generates a control command for increasing or decreasing the transmission power of the mobile communication terminal. For example, the control command has a value "1" when instructing an increase of the transmission power, and has a value "0" when instructing a decrease of the transmission power. This control command is transmitted on the down-link together with the information data, and is also supplied to a data accumulator 196.

The data accumulator 196 is made up of an up-down counter, and carries out an accumulation by making an up-count when the control command has the value "1" and making a down-count when the control command has the value "0". An accumulated data from the data accumulator 196 is supplied to a speed inferring unit 198, and the moving speed is inferred as being higher as the accumulated data becomes larger. A filter tap controller 200 controls the number of taps (stages) of the filter 194 by increasing the number of taps as the inferred moving speed becomes lower, so as to narrow the passing bandwidth.

Further, the present invention is not limited to these embodiments, but various variations and modifications may be made without departing from the scope of the present invention.

What is claimed is:

1. A mobile communication terminal which receives a series of control commands each of which is transmitted within a predetermined time interval on a down-link from a base station and controls a transmission power so that a reception state on an up-link becomes approximately constant at the base station, said mobile communication terminal comprising:

a moving speed inferring unit inferring a moving speed of the mobile communication terminal; and a transmission power controller varying a value to be controlled of the transmission power corresponding to a single control command of the control commands depending on the moving speed inferred in said moving speed inferring unit.

2. A mobile communication terminal which receives a control command transmitted on a down-link from a base station and controls a transmission power so that a reception state on an up-link becomes approximately constant at the base station, said mobile communication terminal comprising:

a moving speed inferring unit interring a moving speed of the mobile communication terminal; and a transmission power controller varying a varying width of the transmission power depending on the moving speed inferred in said moving speed inferring unit, wherein said moving speed inferring unit infers the moving speed based on a number of times a reception level on the down-link per unit link crosses a reference level.

3. A mobile communication terminal which receives a control command transmitted on a down-link from a base station and controls a transmission power so that a reception state on an up-link becomes approximately constant at the base station, said mobile communication terminal comprising:

a moving speed inferring unit interring a moving speed of the mobile communication terminal; and a transmission power controller varying a varying width of the transmission power depending on the moving speed inferred in said moving speed inferring unit, wherein said moving speed inferring unit infers the moving speed based on an accumulated value of fluctuation values of a reception level on the down-link per unit time.

4. A mobile communication terminal which receives a control command transmitted on a down-link from a base station and controls a transmission power so that a reception state on an up-link becomes approximately constant at the base station, said mobile communication terminal comprising:

a moving speed inferring unit interring a moving speed of the mobile communication terminal; and a transmission power controller varying a varying width of the transmission power depending on the moving speed inferred in said moving speed inferring unit, wherein said moving speed inferring unit includes means for sampling fluctuations of a reception level on the down-link at predetermined sampling intervals, and means for inferring the moving speed based on a number of times the fluctuations exceed a threshold value per unit time.

5. The mobile communication terminal as claimed in claim 4, wherein said moving speed inferring unit further includes means for changing the predetermined sampling intervals.

6. A mobile communication terminal which receives a control command transmitted on a down-link from a base station and controls a transmission power so that a reception state on an up-link becomes approximately constant at the base station, said mobile communication terminal comprising:

a moving speed inferring unit interring a moving speed of the mobile communication terminal; and a transmission power controller varying a varying width of the transmission power depending on the moving speed inferred in said moving speed inferring unit, wherein:

said up-link and said down-link employ a direct sequence code division multiple access (DS-CDMA), and said moving speed inferring unit infers the moving speed based on one of a signal level which is obtained by subjecting a received signal on the down-link to a reverse spread and a correlation value of the received signal and a spread code.

7. A mobile communication terminal which receives a control command transmitted on a down-link from a base station and controls a transmission power so that a reception state on an up-link becomes approximately constant at the base station, said mobile communication terminal comprising:

a moving speed inferring unit interring a moving speed of the mobile communication terminal; and a transmission power controller varying a varying width of the transmission power depending on the moving speed inferred in said moving speed inferring unit, wherein:

said up-link and said down-link employ a direct sequence code division multiple access (DS-CDMA), a pilot signal is transmitted on the down-link, and said moving speed inferring unit infers the moving speed based on a frequency change of a pilot signal which is obtained by subjecting a received signal to a reverse spread and a demodulation.

8. A mobile communication terminal which receives a control command transmitted on a down-link from a base station and controls a transmission power so that a reception state on an up-link becomes approximately constant at the base station, said mobile communication terminal comprising:

a moving speed inferring unit interring a moving speed of the mobile communication terminal;

a transmission power controller varying a varying width of the transmission power depending on the moving speed inferred in said moving speed inferring unit;

a rake receiver; and a varying width determination unit determining a varying width of the transmission power based on the moving speed inferred by said moving speed inferring unit and a path number of the down-link obtained in said rake receiver and a path level ratio of reception levels in the paths.

9. A transmission power control method adapted to a mobile communication terminal which receives a control command transmitted on a down-link from a base station and controls a transmission power so that a reception state on an up-link becomes approximately constant at the base station, said mobile communication terminal including a moving speed inferring unit inferring a moving speed of the mobile communication terminal, and a transmission power controller varying a varying width of the transmission power depending on the moving speed inferred in said moving speed inferring unit, said transmission power control method comprising the steps of:

(a) employing a direct sequence code division multiple access (DS-CDMA) on the up-link and the down-link and transmitting a pilot signal on the up-link using an extrapolation technique;

(b) varying, in said transmission power controller, a ratio of transmission powers of a pilot transmission signal and an information data transmission signal on the up-link depending on the moving speed inferred by said moving speed inferring unit; and (c) accumulating, in the base station, control commands to be transmitted to the mobile communication terminal and varying a passing bandwidth of a filter which is provided with respect to a reverse spread pilot signal on the up-link depending on an accumulated value.

10. The transmission power control method as claimed in claim 9, which further comprises the steps of:

(d) inferring, in said moving speed inferring unit, the moving speed based on a number of times a reception level on the down-link per unit link crosses a reference level.

11. The transmission power control method as claimed in claim 9, which further comprises the steps of:

(d) inferring, in said moving speed inferring unit, the moving speed based on an accumulated value of fluctuation values of a reception level on the down-link per unit time.

12. The transmission power control method as claimed in claim 9, which further comprises the steps of:
 (d) sampling, in said moving speed inferring unit, fluctuations of a reception level on the down-link at predetermined sampling intervals; and
 (e) inferring, in said moving speed inferring unit, the moving speed based on a number of times the fluctuations exceed a threshold value per unit time.

13. The transmission power control method as claimed in claim 12, which further comprises the steps of:
 (f) changing, in said moving speed inferring unit, the predetermined sampling intervals.

14. The transmission power control method as claimed in claim 9, which further comprises the steps of:
 (d) inferring, in said moving speed inferring unit, the moving speed based on one of a signal level which is obtained by subjecting a received signal on the down-link to a reverse spread and a correlation value of the received signal and a spread code.

15. The transmission power control method as claimed in claim 9, which further comprises the steps of:
 (d) inferring, in said moving speed inferring unit, the moving speed based on a frequency change of a pilot signal which is obtained by subjecting a received signal to a reverse spread and a demodulation.

16. The transmission power control method as claimed in claim 9, which further comprises the steps of:
 (d) determining a varying width of the transmission power based on the moving speed inferred by said moving speed inferring unit and a path number of the down-link obtained in a rake receiver of the mobile communication terminal and a path level ratio of reception levels in the paths.

17. A mobile communication terminal which receives a series of a control commands each of which is transmitted within a predetermined time interval on a down-link from a base station and controls a transmission power so the a reception state on an up-link becomes approximately constant at the base station, said mobile communication terminal comprising:
 a moving speed inferring unit inferring a moving speed of the mobile communication terminal; and
 a transmission power controller controlling a varying width of a value of the transmission power corresponding to a single control command of the control commands depending on the moving speed inferred in said moving speed inferring unit.

18. A mobile communication terminal which receives a series of transmission power control commands each of which is transmitted within a predetermined interval on a down-link from a base station and controls a transmission power so that a reception state on an up-link becomes approximately constant at the base station, said mobile communication terminal comprising:
 a moving speed inferring unit inferring a moving speed of the mobile communication terminal; and
 a transmission power controller varying a controlling width of a value of the transmission power corresponding to a single control command of the control commands depending on the moving speed inferred in said moving speed inferring unit.

\* \* \* \* \*